United States Patent
Seagriff et al.

(10) Patent No.: US 11,610,573 B2
(45) Date of Patent: *Mar. 21, 2023

(54) NOISE CANCELLATION USING SEGMENTED, FREQUENCY-DEPENDENT PHASE CANCELLATION

(71) Applicant: Silencer Devices, LLC., Hackensack, NJ (US)

(72) Inventors: Eugene Seagriff, Edison, NJ (US); Jean-Claude Junqua, Saratoga, CA (US)

(73) Assignee: Silencer Devices, LLC., Hackensack, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,087

(22) Filed: Oct. 14, 2021

(65) Prior Publication Data

US 2022/0068252 A1 Mar. 3, 2022

Related U.S. Application Data

(63) Continuation of application No. 16/924,368, filed on Jul. 9, 2020, now Pat. No. 11,200,878, which is a
(Continued)

(51) Int. Cl.
*G10K 11/178* (2006.01)
*H04L 9/40* (2022.01)

(52) U.S. Cl.
CPC ........ *G10K 11/178* (2013.01); *G10K 11/1785* (2018.01); *H04L 63/0428* (2013.01);
(Continued)

(58) Field of Classification Search
CPC ............ G10K 11/178; G10K 11/1785; G10K 11/17879; G10K 2210/1081;
(Continued)

(56) References Cited

U.S. PATENT DOCUMENTS

| | | |
|---|---|---|
| 4,435,751 A | 3/1984 | Hori et al. |
| 5,140,640 A | 8/1992 | Graupe et al. |

(Continued)

FOREIGN PATENT DOCUMENTS

| | | |
|---|---|---|
| EP | 0868082 A2 | 9/1998 |
| JP | 2008260419 A | 10/2008 |

(Continued)

*Primary Examiner* — Jason R Kurr
(74) *Attorney, Agent, or Firm* — Harness, Dickey & Pierce, P.L.C.

(57) ABSTRACT

Noise abatement within a signal stream containing unwanted signal referred to as noise is performed by acquiring a digitized noise signal and using a digital processor circuit to subdivide the acquired noise signal into different frequency band segments and thereby generate a plurality of segmented noise signals. Then individually for each segmented noise signal, the processor shifts in time the segmented noise signal by an amount dependent on a selected frequency of the segmented noise signal to produce a plurality of shifted segmented noise signals. The precise time shift applied to each noise segment considers the frequency content of the segment and the system processing time. Individually for each segmented noise signal, amplitude scaling is applied. The shifted and amplitude-scaled segmented noise signals are then combined to form a composite anti-noise signal which is output into the signal stream to abate the noise through destructive interference.

13 Claims, 19 Drawing Sheets

Related U.S. Application Data continuation of application No. 15/497,417, filed on Apr. 26, 2017, now Pat. No. 10,720,139.

(60) Provisional application No. 62/455,180, filed on Feb. 6, 2017.

(52) U.S. Cl.
CPC ............... *G10K 2210/1081* (2013.01); *G10K 2210/112* (2013.01); *G10K 2210/12* (2013.01); *G10K 2210/1282* (2013.01); *G10K 2210/3012* (2013.01); *G10K 2210/3025* (2013.01); *G10K 2210/3026* (2013.01); *G10K 2210/3028* (2013.01); *G10K 2210/3044* (2013.01); *G10K 2210/3057* (2013.01); *G10K 2210/511* (2013.01)

(58) Field of Classification Search
CPC ......... G10K 2210/112; G10K 2210/12; G10K 2210/1282; G10K 2210/3012; G10K 2210/3025; G10K 2210/3026; G10K 2210/3028; G10K 2210/3044; G10K 2210/3057; G10K 2210/511; H04L 63/0428
See application file for complete search history.

(56) References Cited

U.S. PATENT DOCUMENTS

| | | |
|---|---|---|
| 5,253,299 A | 10/1993 | Ishida et al. |
| 5,425,105 A | 6/1995 | Lo et al. |
| 6,654,467 B1 | 11/2003 | York et al. |
| 8,027,743 B1 | 9/2011 | Johnston |
| 8,718,291 B2 | 5/2014 | Alves et al. |
| 9,246,545 B1 | 1/2016 | Ayrapetian et al. |
| 10,477,333 B1 | 11/2019 | Pogue et al. |
| 2010/0028134 A1 | 2/2010 | Slapak et al. |
| 2012/0140942 A1 | 6/2012 | Loeda |
| 2012/0308029 A1 | 12/2012 | Christoph |
| 2013/0034236 A1 | 2/2013 | Hung et al. |
| 2013/0070872 A1 | 3/2013 | Macrae |
| 2015/0154950 A1 | 6/2015 | Ring |
| 2016/0240183 A1 | 8/2016 | Noh et al. |
| 2016/0321028 A1 | 11/2016 | Doerbecker |
| 2016/0343385 A1 | 11/2016 | Hetherington et al. |
| 2018/0019774 A1 | 1/2018 | Hampel et al. |
| 2018/0151172 A1* | 5/2018 | Min ................. H04R 1/1083 |

FOREIGN PATENT DOCUMENTS

| | | |
|---|---|---|
| JP | 2018520391 A | 7/2018 |
| WO | WO-2016195239 A1 | 12/2016 |

* cited by examiner

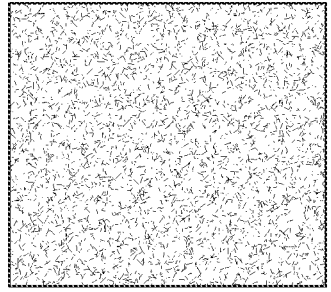

"WHITE/RANDOM"
NOISE SIGNAL

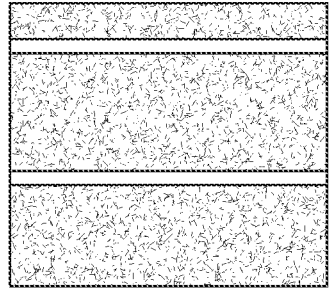

SILENCER SYSTEM IS PROGRAMMED
TO "CARVE" NARROW FREQUNCY CHANNELS
INFO THE WHITE NOISE

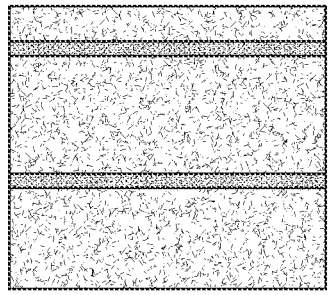

CARRIER SIGNALS OF THE
"CHANNEL" FREQUENCIES ARE
MODULATED TO ENCODE
INFORMATION; AND MIXED
WITH THE SILENCER OUTPUT

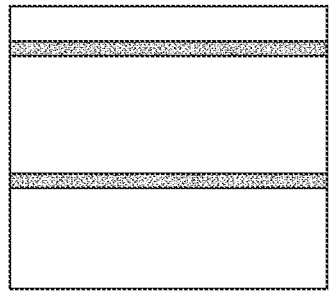

SILENCER SYSTEM IS PROGRAMMED
TO REMOVE EVERYTHING EXCEPT
THE NARROW FREQUENCY CHANNELS
CONTAINING THE ENCODED
INFORMATION

FIG 21

NOISE CANCELLATION USING SEGMENTED, FREQUENCY-DEPENDENT PHASE CANCELLATION

CROSS REFERENCE TO RELATED APPLICATION

This application is a continuation of U.S. Ser. No. 16/924,368, filed Jul. 9, 2020, which is a continuation of U.S. Ser. No. 15/497,417 filed on Apr. 26, 2017, which claims the benefit of U.S. Provisional Application No. 62/455,180, filed on Feb. 6, 2017. The entire disclosures of the above applications are incorporated herein by reference.

FIELD

This disclosure relates generally to electronic and automatic noise cancellation techniques. More particularly the disclosure relates to a noise cancellation technique that generates frequency dependent anti-noise components at a plurality of spectrum segments, precisely calculated for the system and application.

BACKGROUND

Scientists and engineers have been working on the problem of electronic, automatic noise cancelling (ANC) for decades. The basic physics of wave propagation suggests it is possible to create an "anti-noise" wave that is 180 degrees out of phase with the noise signal, and cancel the noise completely through destructive interference. This works reasonably well for simple, repetitive, low-frequency sounds. However, it does not work well for dynamic, rapidly changing sounds, or those containing higher frequencies.

The best current systems (using a hybrid design combining feed forward and feedback), can reduce repetitive noise (like an engine or fan) at frequencies up to 2 kHz using variants of LMS (Least Mean Square) Adaptive Filtering to create the anti-noise signal by repetitively estimating the transfer function that will create the least noise practical at the output. Although companies continue to invest in improving ANC results, their activity appears to be focused on improving upon these existing techniques Moreover, despite having greater processing power available, it appears that ANC using various adaptive filters has an upper frequency limit somewhere below 4 kHz and the ability to attenuate signals by between 10 dB and 30 dB.

SUMMARY

In contrast to the conventional approach, the disclosed system is capable of cancelling virtually any frequency range in offline mode, and at least the full audio spectrum in real time at commercially common processing speeds, more effectively than current methods being used.

Processing speed and computing power continue to consistently increase rapidly (Moore's Law has held true since 1965, for example). Some commercial and military markets are less cost-sensitive (than most consumer product applications) and can accommodate the higher cost of current top speeds/power. In addition, the extraordinary power of quantum computing is on the horizon. Therefore, we have envisioned and are including embodiments of the disclosed system and method which are expected to become more and more commercially viable over time. Thus in the present disclosure, for simplicity, we have reduced the number of embodiments to five primary embodiments defined by a minimum number of different hardware system structures required to realize the myriad of applications for the invention. The hardware system structures are part of the invention in that they integrate in specific ways with variations of what we refer to as the "Core Engine" signal processing methodology. The essential elements of these five embodiments are depicted in FIGS. 1-5. Broadly, the five embodiments may be described as: In-Air Systems; Telecommunications and Personal Use Systems; Offline Signal Processing Systems; Encryption/Decryption Systems; and Signal Signature Recognition, Detection, and Reception Systems.

The disclosed technique constructs, utilizes and applies the precise anti-noise needed across the signal spectrum in real time. The system/algorithm is flexible, permitting higher or lower resolution and control as required by the application (or as practical, given cost constraints on processing power or other limiting factors imposed on a product engineer deploying the invention). Integration of this versatile and effective technique into particular hardware and software system structures facilitates a wide variety of applications. We are loosely classifying them into five areas based upon the system structures we have envisioned so far: In-Air Systems; Telecommunications and Personal Use Systems; Offline Signal Processing Systems; Encryption/Decryption Systems; and Signal Signature Recognition, Detection, and Reception Systems. It is best to consider this list representative of the system potential, as they are not intended to limit the scope of this disclosure.

In addition to being useful across the audio spectrum, the disclosed techniques may also be used on electromagnetic signals as well. Thus the disclosed techniques are capable of cancelling virtually any frequency range in offline mode, and at least the full audio spectrum in real time, using presently commercially available processors. It is anticipated that as processor speeds increase, or by aggregating the power of multiple processors, real time processing of any electromagnetic signal will be possible with this invention.

The algorithm processes discrete frequency segments individually by calculating the ideal anti-noise for the system or application, greatly enhancing the noise-cancelling performance across the audio spectrum. In fact, this algorithm can successfully cancel the entire audio spectrum in off-line and signal processing applications. It is also more effective across the audio spectrum in headphones and in-air systems, and can handle higher frequencies than any other system being deployed. Processing discrete frequency segments (and permitting ranges or bands of frequencies to be grouped together, as described later), enables customizing the algorithm to perform well for any specific application, in or well beyond the audio spectrum.

Processing the discrete frequency segments enables creating anti-noise for dynamic noise sources, which change rapidly in time. (Current methods being commercially deployed are limited to cyclical, steady-state type sounds like engine noise.) Processing discrete frequency segments also reduces the need for multiple input microphones in headphones/earbuds.

In audio application, the algorithm also reduces the number of microphones required for microphone noise cancelling, and the need for complex "beam-forming" algorithms to identify desired speech from ambient noise. This is especially the case on a telecommunications headset because the anti-noise created for the ear pieces should also effectively cancel unwanted signals when added to the mic input signal with minor delay adjustment (perhaps utilizing passive components to provide the required delay). If desired the feedback processing can be adapted and stored in presets.

A calibration mode reduces the need for expensive tuning of the system for various physical systems, both in the product development stage and in mass production.

The use of frequency bands or ranges in versions of the algorithm provides a variety of advantages, including:

i. Reduce the amount of processing power and memory required;

ii. Facilitate maximizing the system performance for specific applications quickly and easily;

iii. Enable the creation and deployment of Presets for various types of noise, environments, etc.;

iv. Enable the use of the algorithm to enhance the clarity of specific signals within a noisy environment. This permits the algorithm to be deployed for use in hearing aids (better discerning speech in a noisy restaurant for example), in audio surveillance applications (parsing speech from ambient noise), in recognizing device signatures on a network or in a noise field, or in encryption/decryption applications.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 21 illustrates an exemplary encryption-decryption embodiment.

Corresponding reference numerals indicate corresponding parts throughout the several views of the drawings.

DESCRIPTION OF PREFERRED EMBODIMENTS

Example embodiments will now be described more fully with reference to the accompanying drawings.

The disclosed silencer device can be deployed in a variety of different applications. For illustration purposes, five exemplary embodiments will be discussed in detail here. It will be understood that these examples provide an understanding of some of the different uses for which the silencer device may be employed. Other uses and other applications are also possible within the scope of the appended claims.

Figure 1:
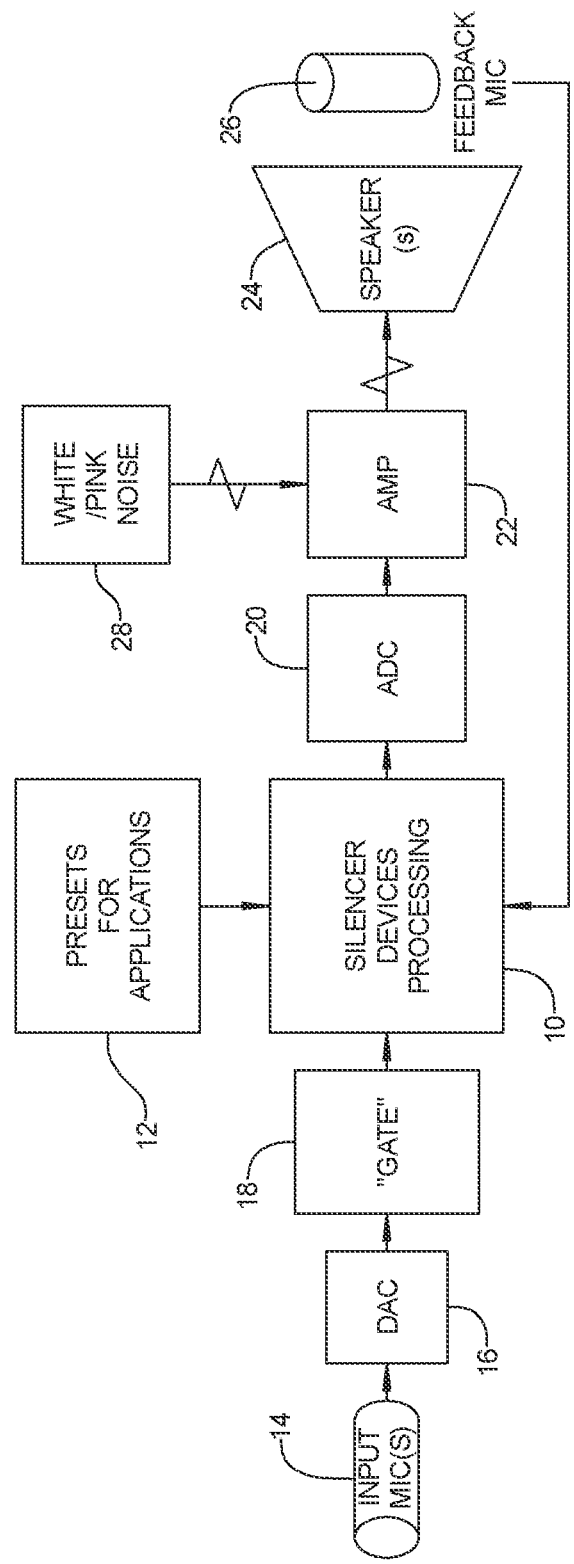
FIG. 1 is a block diagram of a first embodiment of a silencer device, useful in providing noise abatement or noise cancellation in an in-air system.

Referring to FIG. 1, a first exemplary embodiment of the silencer device has been illustrated. This embodiment is designed to provide noise cancellation for an in-air system, where incoming environmental noise is sensed and a noise cancelling signal is generated and broadcast into the surrounding area. As illustrated, this embodiment includes a digital signal processor circuit 10 having an associated memory 12 in which configuration data, referred to herein as presets for applications, are stored. The digital signal processor circuit may be implemented using a commercially available multimedia processor integrated circuit, such as the Broadcom BCM2837 Quad Core ARM Cortex A53 processor, or the like. The details of how the digital signal processor circuit is programmed are provided below. In a preferred embodiment the digital signal processor circuit can be implemented using a Raspberry Pi computer, such as a Raspberry Pi 3 model B, or better. This device includes the signal processor circuit 10 as well as a VideoCore IV GPU, onboard SDRAM, a WiFi and Bluetooth transceiver circuit, an 802.11n wireless LAN circuit and support for Bluetooth 4.1 communication. Twenty-six GPIO ports are provided as well as four USB 2 ports, a 100Base-T Ethernet port, DSI and CSI ports, a 4-pole composite video/audio port and an HDMI 1.4 port. These ports can be used to provide connectivity between the inputs and outputs to the signal processor circuit 10 as shown in the block diagrams of FIGS. 1-4.

The in-air noise cancellation system of FIG. 1 includes one or more input microphones 14 that are deployed in a physical location where they can sense the noise source that is desired to be cancelled. Each of the microphones 14 is coupled to a digital to audio convertor or DAC 16 that converts the analog signal waveform from the coupled microphone into digital data, as by sampling. While different sampling rates may be utilized as appropriate for the task, the illustrated embodiment uses a 48 kHz. sampling rate. The sampling rate is chosen in view of the frequency range occupied by the majority of the noise sound energy, the distance between the input and feedback microphones, and other factors related to the specific application and goals.

Coupled to between the DAC 16 and the digital signal processor circuit 10 is an optional gate circuit 18 that passes noise energy above a predetermined threshold and blocks energy below that threshold. The gate circuit 18 may be implemented using software run on the processor or using a standalone noise gate integrated circuit. The purpose of the gate circuit is to discriminate between an ambient background noise level that is not considered objectionable, and a higher noise level associated with an objectionable noise. For example, if the in-air noise cancellation system is deployed to abate intermittent road noise from a nearby highway, the gate threshold would be configured to open when sound energy of vehicle traffic is detected, and close when only rustling leave of a nearby grove of trees is detected. In this way the gate helps reduce the load on the digital signal processor 10, and prevent unwanted pumping.

The gate can be user configurable, allowing the user to set a noise threshold so that only sounds above that threshold are treated as noise. For example, in a quiet office the ambient noise level may be around 50 dB SPL. In such an environment, the user might set the noise threshold to act only upon signals greater than 60 dB SPL.

Coupled to the output of the digital signal processor circuit 10 is a digital to analog converter or ADC 20. The ADC serves as the complement of the DAC 16, converting the output of the digital signal processor circuit 10 into an analog signal. The analog signal represents a specifically constructed noise cancellation signal designed to cancel the noise detected by the input microphone(s) 14. A suitable amplifier 22 and loudspeaker or transducer system 24 projects or broadcasts this noise cancellation signal into the air where it will mix with and cancel the noise source as heard from a vantage point within effective transmission area of the loudspeaker or transducer system 24. In essence, the loudspeaker system 24 is positioned between the noise source and the listener or receiving point, so that the listener/receptor can receive signal reaching his or her location, except that signals from the noise source are negated by the noise cancellation signal from the loudspeaker or transducer system 24.

If desired, the circuit may also include a white or pink noise source that is fed to the amplifier 22, essentially mixing a predetermined amount of white noise or pink noise with the analog signal from the digital signal processing circuit 10 (via ADC 20). This noise source is helpful in softening the effect of the noise cancellation signal by masking otherwise audible transients that can occur when the noise cancellation signal combines with the noise source signal downstream of the loudspeaker.

A feedback microphone 26 is positioned in front of (downstream of) the loudspeaker system 24. The feedback microphone is used to sample the signal stream after the introduction of the anti-noise to the stream. This microphone provides a feedback signal to the digital signal processor circuit 10 that is used to adapt the algorithm controlling how the digital signal processor circuit generates the proper noise cancelling signal. Although not shown in FIG. 1, the feedback microphone output can be processed by suitable amplifying and/or analog to digital converter circuits to provide the feedback signal used by the noise cancellation algorithm. In some applications where only the amplitude of the noise vs noise cancellation signal is utilized, the feedback microphone output may be processed in the analog domain to derive an amplitude voltage signal, which can be processed by averaging or other means if desired. In other applications where a more precise assessment of the noise vs noise cancellation signal is desired, a phase comparison to the input mic signal may also be made. In most implementations of this embodiment of the system, both the phase and amplitude of discrete segments of the feedback signal will be analyzed in comparison to the input mic signal, or the desired result for the application (the creation and processing of discrete segments is discussed later in this document). The feedback microphone output may be sampled and converted to the digital domain using an analog to digital converter. The feedback mic may be connected to either a mic input or line input coupled to the video/audio port of the digital signal processor circuit.

For additional examples of the noise abatement system of FIG. 1, see the section entitled "Different Use Case Embodiments" below.

Figure 2:
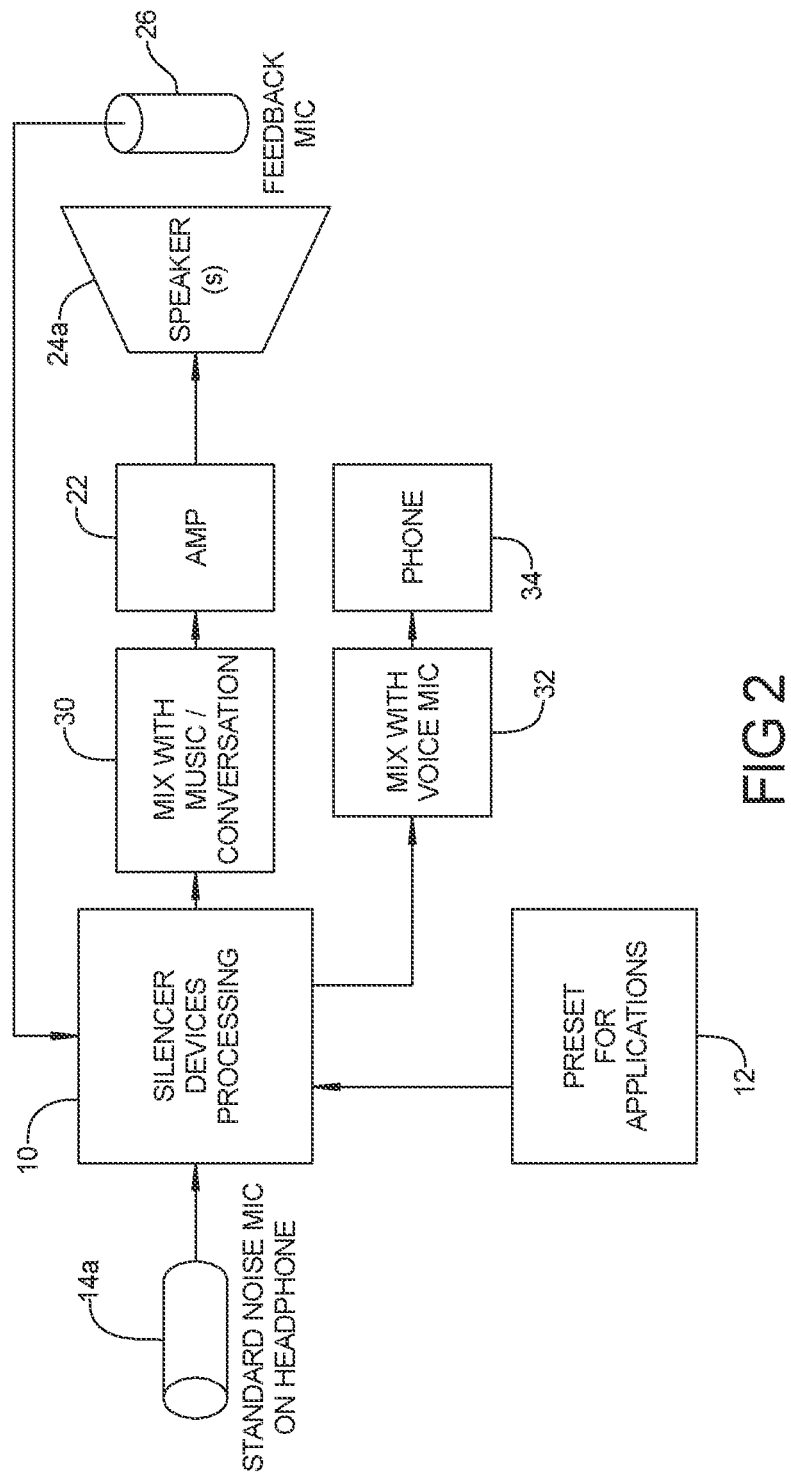
FIG. 2 is a block diagram of a second embodiment of a silencer device, useful in providing noise abatement or noise cancellation in a telecommunications microphone, telecommunications headset, or headphone/earbud system.

A second embodiment of silencer device is illustrated in FIG. 2. As will be explained, this embodiment features two signal paths, a received audio signal path that abates noise in the user's earphones, headphones or speakers 24*a*; and a transmitted audio signal path where sounds captured by the microphone of the phone 34 are processed to abate ambient noise also captured by the microphone of the phone 34. The received audio signal path would thus be used to improve what the user hears in his or her earphones, headphones or speakers buy reducing or eliminating ambient sounds within the environment. This makes listening to music or listening to phone conversation easier. The transmitted audio signal path would be used to partially or fully cancel out ambient sounds, like wind noise, entering the microphone of the user's phone 34. Of course, the same noise cancellation techniques can be used with other systems, not just phones, including live recording mics, broadcast mics and the like.

With reference to FIG. 2, the illustrated exemplary embodiment is adapted for use with a headset system and shares some of the same components as the embodiment of FIG. 1. In this embodiment, the input microphone is implemented using one or more noise sensing microphones 14*a* disposed on the outside of the headset or headphone/earbuds. Analog to digital circuitry associated with or integral to each noise sensing microphone converts the surrounding noise into digital signals that are fed to the digital signal processing circuit 10. The feedback microphone 26 is disposed within the headphones/earbuds, in audio coupling with the headphone speaker(s) 24*a*, or the feedback microphone may be eliminated entirely because this is a more tightly controlled physical embodiment. In systems including the feedback microphone, the feedback mic data includes the components of the composite signal which may include desired entertainment content (e.g., music or audio/video soundtrack) and/or voice signal, plus the noise and anti-noise, and which may be compared to the noise and anti-noise signal, or a composite of the input and desired signal.

Note that this system differs significantly from conventional systems because the ability to effectively cancel sounds with frequency components above 2000 Hz reduces the need for the acoustic isolation methods deployed on conventional noise cancelling headphones. This enables the production of lighter weight and less expensive products, and facilitates effective deployment in the "earbud" form factor.

In this embodiment, the silencer device's noise processing can be implemented independently for each earpiece. For lower cost headphone/earbud/headset products, the processing can be implemented jointly for both earpieces in a stereo system, or the processing could be handled by an outboard processor residing in a smart phone or other device.

Another important difference in this embodiment is that the calibration mode will also be used to calculate the appropriate amplitude adjustments required for each frequency band range to compensate for the effect the physical properties of the headphone or earbud construction has on the surrounding/unwanted noise before it reaches the ear (calibration mode and frequency band ranges are discussed later in this document).

Similarly, the anti-noise produced by the system in this embodiment is mixed with the desired music or voice signal via mixer 30 (the desired music or voice signal is provided by a phone 30, music player, communications device, etc.), and the two will often be output together via a common speaker. In that use case, the feedback microphone will only be functioning during calibration mode and may be omitted on production units under certain circumstances. Alternatively, the feedback microphone can be continuously functioning in certain multi-speaker applications of this embodiment (in VR and Gaming headsets, for example).

In headset systems that include a voice microphone, the output of the digital signal processor circuit 10 can be fed to the voice microphone circuit as well as to the headphone speaker circuit, as described above. This has been illustrated in FIG. 2, where a first output signal is fed from the digital signal processor circuit 10 to a first mixer 30 that supplies the audio playback system (amp 22 and headphone speaker 24a). A second output signal is fed from the digital signal processor circuit 10 to a second mixer 32 that supplies the phone 34 or other voice processing circuit. Since the ambient noise signal is sampled at location(s) remote from the position of the communications/voice microphone, the desired voice signal will not be cancelled. This alternate anti-noise signal may or may not have the frequency band amplitudes adjusted during calibration mode as described above, depending on the application.

For critical communications applications, such as media broadcasts or warfighter communications, a separate signal processing circuit may be desired and used for the microphone noise cancelling. This would permit precise cancellation of known noise signatures, provide the ability to never cancel certain critical information frequency bands, and facilitate other customization for these mission-critical applications via user configuration or presets.

For additional examples of the noise abatement system of FIG. 2, see the section entitled "Different Use Case Embodiments" below.

Figure 3:
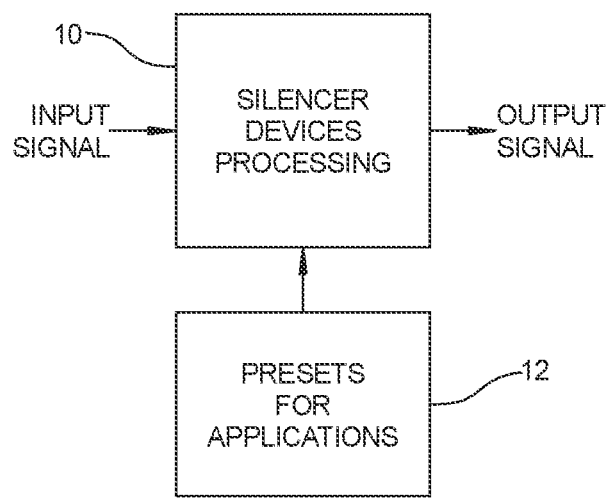
FIG. 3 is a block diagram of a third embodiment of a silencer device, useful in providing noise abatement or noise cancellation in a signal processing system.

A third, more generalized embodiment is shown in FIG. 3. In this embodiment, the input signal may be derived from any source and the output signal may be coupled to a circuit or device (not shown) that normally processes the input signal. Thus the embodiment of FIG. 3 is designed to be interposed within or placed in-line with a signal processing device or transmission. In this embodiment, feedback will usually not be used. The known noise characteristics can be compensated for by the system parameters (set using settings labelled "Presets" 12). If those characteristics are not known, the system can be calibrated to cancel the noise by processing a section of the material which has noise, but does not contain signal (for example, the system could be calibrated to the noise signature using the "pre-roll" portion of a video segment). Applications of this embodiment include removing noise from recordings of events or audio surveillance, or removing them in a "live" situation with an appropriate amount of "broadcast delay", such as the "7 second" delay currently used to enable the censorship of profanity during live broadcasts.

While a standalone digital signal processor circuit 10 has been illustrated in the above examples, it will be appreciated that the processor within a mobile device, such as a smartphone, can be used to perform the signal processing algorithms; or the core engine could be implemented as a "plug in" for a software suite, or integrated into another signal processing system. Thus the description herein shall also use the term core engine to refer the signal processing algorithms as more fully described below that are run on a processor such as a standalone digital signal processor circuit or a processor embedded in a smartphone or other device. As depicted by the embodiment of FIG. 3, the core engine can be used to process noise in an offline mode or in signal processing applications where the input microphone, output amplified loudspeakers and feedback microphone may not be required.

For additional examples of the noise abatement system of FIG. 3, see the section entitled "Different Use Case Embodiments" below.

Figure 4:
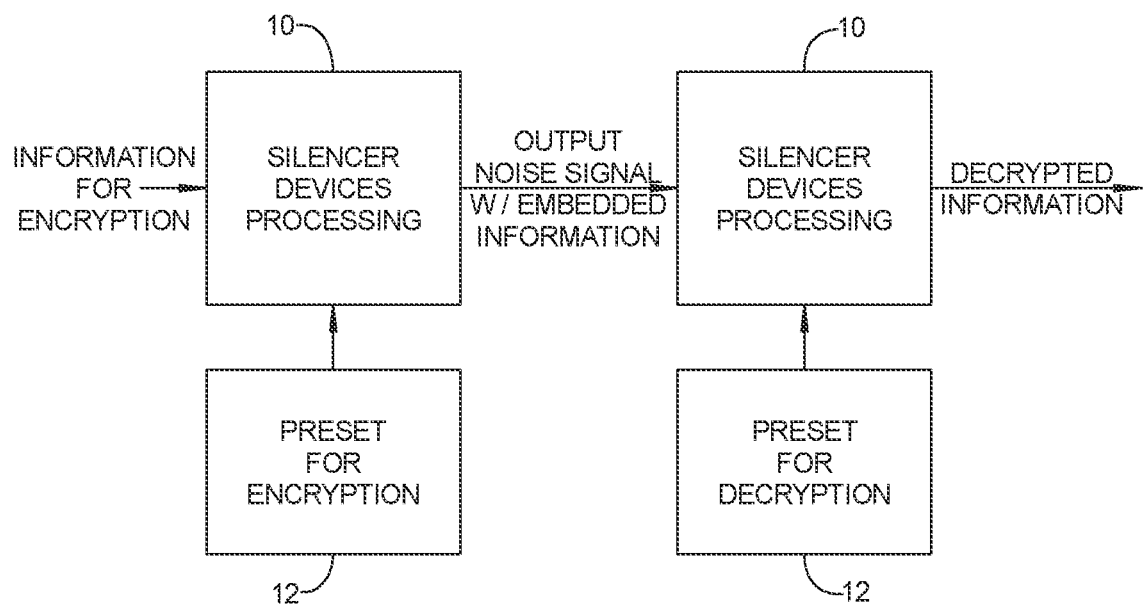
FIG. 4 is a block diagram of a fourth embodiment of a silencer device, useful in encrypting and decrypting confidential communications.

A fourth embodiment is shown in FIG. 4. In this embodiment, there are two parties desiring to share information with each other via files, broadcasts, signal transmissions, or other means; and restrict access to that information. This embodiment requires both the "encoding party" and the "decoding party" to have access to equipment containing this invention.

The encryption/decryption "key" is the recipe for the frequency band range settings used to encode the information. The settings for the encryption and decryption "key" will be created considering the characteristics of the noise or other signal the information will be embedded in, and these frequency band range settings include both frequency and amplitude information. This enables embedding encoded signals into very narrow segment(s) of a transmission that would appear to be an innocuous wideband transmission of some other material or a "white noise" signal, for example. In an example embedding an intelligence transmission in what appeared to be white noise, encryption would require a white noise recording of an appropriate length to carry the full message. That white noise recording would be processed with this invention for only a very narrow frequency range or set of ranges (i.e. very narrow slice(s) of the noise would be "carved out" by the Core Engine), with the frequencies not included in this defined set of ranges being passed through the system unchanged (the default amplitude would be set to 1 for frequencies not included in the frequency band definitions on the encryption side); and amplitudes for the frequency range(s) that will contain the intelligence can be adjusted to facilitate concealment within the noise. The information to be shared could be encoded in a "carrier signal" within the narrow frequency range(s) using frequency modulation or other techniques (providing another layer of encryption), which would be mixed with the system output (the noise with the slices "carved out"). This will effectively embed the information in what would appear to be a random white noise signal, in this example (or another type of broadband or signal transmission, as desired).

On the "decryption" side, the frequency and amplitude settings for the frequency band range(s) describing where the information was recorded would need to be known, to serve as the "decryption key". On the decryption side, the default amplitude for frequencies not included in the definition of the frequency band ranges must be set to 0. This means the system will not produce any output for those frequencies which are not included in the definition of the frequency bands, so that only the desired signal to be decoded is output.

The ability to select the default amplitude for frequencies not included in defined frequency band ranges is one of the defining characteristics of this embodiment.

Security of the information transfer is greatly enhanced if the encryption/decryption "key" is shared between the party by alternate means, but it could conceivably be included in a "calibration header" in the transmission or file, calculated based on a time stamp or other setting, etc.

For additional examples of the noise abatement system of FIG. 4, see the section entitled "Different Use Case Embodiments" below.

Figure 5:
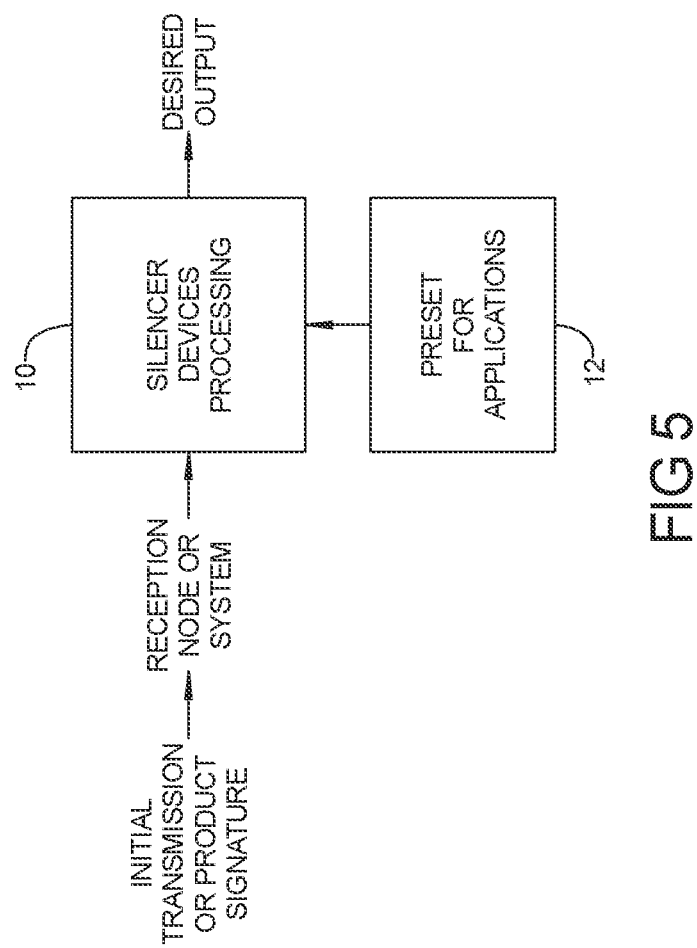
FIG. 5 is a block diagram of a fifth embodiment of a silencer device, useful clearing noise from electromagnetic transmission, and in separating specific equipment signatures or communications from the background noise of power lines (for use in Power Line Communications and Smart Grid applications, for example).

A fifth embodiment is shown is FIG. 5. In this embodiment, the invention is deployed to aid in the recognition, detection, or reception of transmissions or device signatures in a field of noise, such as the noise fields present in the density of electromagnetic fields in major cities and other areas, that are inherent in power transmission lines, etc.

The invention can be used to aid in the detection, recognition or reception of signals in such noise by creating presets for the frequency band range settings designed to pass the target signal only. These frequency band range settings include both frequency and amplitude information required to identify the "fingerprints" or "signatures" of the target signals against the characteristics of the background noise, as determined by prior analysis. These setting would be accomplished by excluding the target signal frequency components from the frequency band settings and using a default amplitude of 0 for frequencies not included in the band settings, effectively passing only the target signals through the system; and appropriately adjusting the amplitude and frequency of adjacent frequencies or harmonics to further enhance the target signal. This would aid in detecting faint signals which would otherwise be unnoticed in the noise field.

For example, when an air conditioning system's compressor turns on a unique impulse is imparted to the grid. A power company substation may deploy this invention in a system to help them anticipate peak loads by counting the impulses from various products. In Power Line Communications applications, the characteristics of "normal" noise and fluctuations can be minimized and the desired communication signals can be enhanced by deploying presets designed for that task. Presets can also be designed to detect or enhance distant or faint electromagnetic communications. Similarly, presets can be designed to detect disturbances in a noise field identified with certain types of objects or other potential threats.

In this embodiment, multiple instances of the core engine may be deployed on a server (or other multi-core or multiplex device) to facilitate recognition, detection or reception of a variety of signal or signature types at a single node.

For additional examples of the noise abatement system of FIG. 5, see the section entitled "Different Use Case Embodiments" below.

Overview of the Core Engine Noise Cancelling Algorithm

The essence of the core engine noise cancelling algorithm is to create the perfect anti-noise for many small, discrete segments comprising a noise signal. The digital signal processing circuit 10 (whether implemented as a standalone circuit or using the processor of another device, such as a smartphone) is programmed to perform a signal processing algorithm that precisely generates a tailored set of noise cancelling signals individually for each of a set of discrete frequency segments comprising the target noise signal, or portions thereof.

Figure 6:
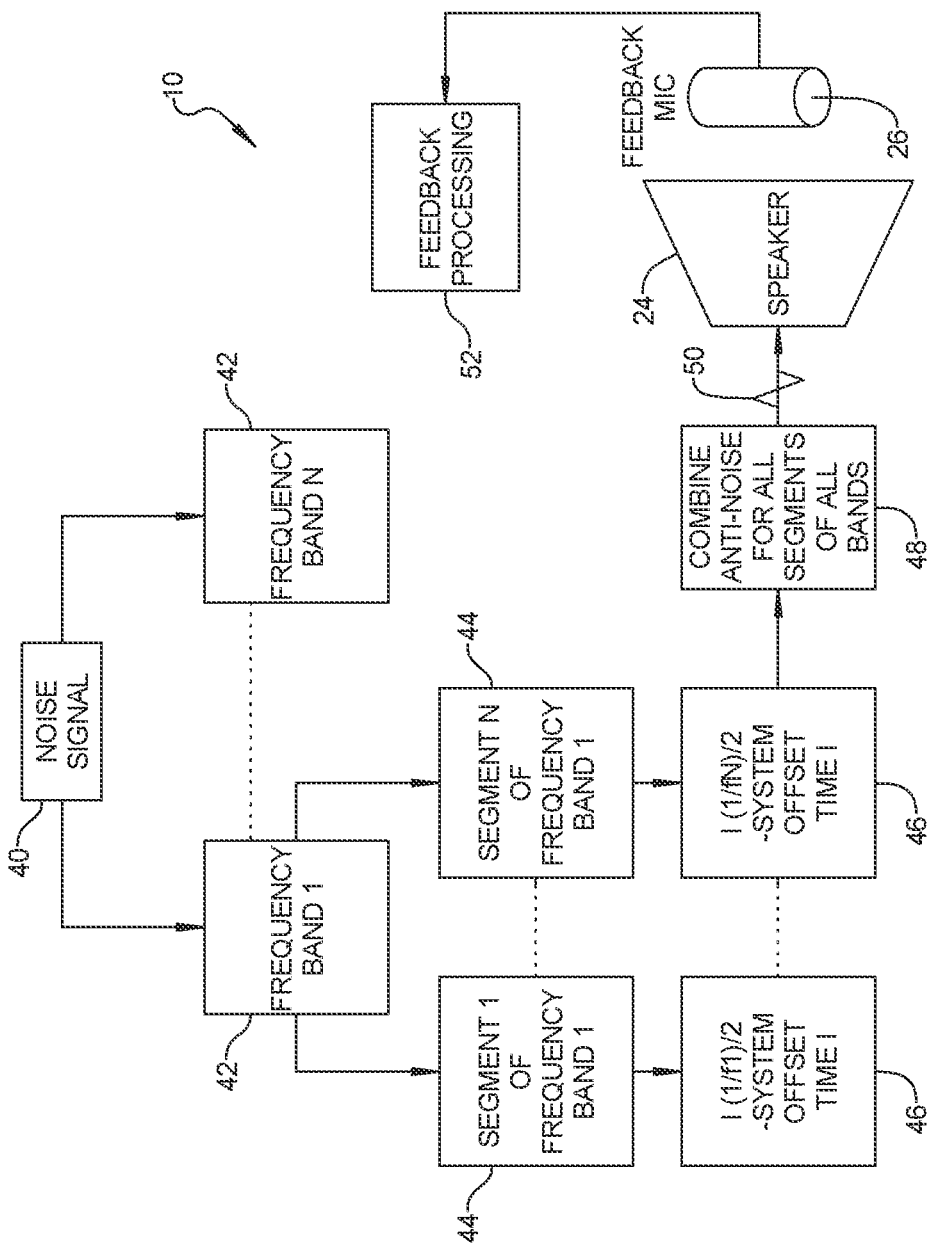
FIG. 6 is a block diagram illustrating a manner of programming a digital processor circuit to perform the core engine algorithm used in the silencer device.

FIG. 6 shows the basic architecture of the core engine noise cancelling algorithm. As illustrated, the acquired noise signal 40 is subdivided into different frequency band segments. In a presently preferred embodiment, the width of those segments (and in some embodiments an amplitude scaling factor to be applied to the anti-noise) in various frequency ranges can be set differently for each of the different frequency bands 42. These parameters for the frequency bands can be set via a User Interface, presets, or dynamically based on criteria, in various embodiments. Each frequency band range is then further subdivided into frequency band segments of the width selected. Then for each frequency band segment, the digital signal processing circuit shifts the phase of that segment by an amount dependent on a selected frequency of the segmented noise signal. For example, the selected frequency can be the center frequency of the band segment. Thus if a particular band segment extends from 100 Hz. to 200 Hz., the selected center frequency could be 150 Hz.

By segmenting the incoming noise signal into a plurality of different frequency segments, the digital signal processing circuit is able to adapt the noise cancelling algorithm to the particular requirements of a given application. This is done by selectively controlling the size of each segment to suit the particular application. By way of example, each segment across the entire frequency range of the incoming noise signal can be quite small (e.g., 1 Hz). Alternatively, different portions of the frequency range can be subdivided into larger or smaller segments, using smaller (higher resolution) segments where the most important information content resides, or the short wavelengths require it; and using larger (lower resolution) segments at frequencies that carry less information, or have longer wavelengths. In some embodiments, the processor not only subdivides the entire frequency range into segments, but can also separately manipulate amplitude within a given segment differently based on settings in the frequency band ranges.

Where extremely high noise cancellation accuracy is desired, the noise signal is divided into small segments (e.g., 1 Hz or other size segments) across the entire spectrum, or across the full spectrum of the noise signal, as appropriate. Such fine-grained segmentation does require significant processing power. Thus in applications where a lower power, lower cost processor is desired, the core engine noise cancellation algorithm is configured to divide the signal into frequency bands or ranges. The number of frequency bands can be adjusted in the core engine software code to suit the needs of the application. If desired, the digital processor can be programmed to subdivide the acquired noise signal by applying wavelet decomposition to subdivide the acquired noise signal into different frequency band segments and thereby generate a plurality of segmented noise signals.

For each given application, the segment size and how/if the size will vary across the spectrum is an initial condition of the system, determined by defining parameters for various frequency ranges. These parameters can be set through a user interface and are then stored in the memory 12 as presets for each application.

Once the noise signal has been segmented according to the segmentation plan established by the digital signal processing circuit (automatically and/or based on user configuration), a phase correction is selectively applied to each segment to produce a segment waveform that will substantially negate the noise signal within that segment's frequency band through destructive interference. Specifically, the processing circuit calculates and applies a frequency dependent delay time 46, considering the frequency of the segment and accounting for any system propagation or delay time. Because this frequency dependent delay time is calculated and applied individually to each segment, the processing circuit 10 calculates and applies these phase correction values in parallel or very rapidly in series. Thereafter, the phase corrected (phase shifted) segmented noise signals are combined at 48 to produce a composite anti-noise signal 50 that is then output into the signal stream to abate the noise by destructive interference. As illustrated in FIG. 6, the anti-noise signal can be introduced into the signal stream via an amplified loudspeaker system or other transducer 24. Alternatively, in certain applications the anti-noise signal can be introduced into the signal stream using a suitable digital or analog mixer.

In some embodiments, noise abatement can be further enhanced by using a feedback signal. Thus as shown in FIG. 6, a feedback microphone 26 may be positioned within the signal stream, downstream of where the anti-noise signal was introduced. In this way the feedback microphone senses the results of destructive interference between the noise signal and the anti-noise signal. A feedback signal derived from the feedback microphone is then supplied to the processing circuit 10 for use in adjusting the amplitude and/or the phase of the anti-noise signal. This feedback processing is illustrated generally at 52 in FIG. 6. Feedback processing 52 comprises converting the feedback microphone signal into a suitable digital signal, through analog to digital conversion, and then adjusting the amplitude and/or phase of the anti-noise signal for maximum noise abatement, using the feedback microphone signal as a reference. When the anti-noise signal and the noise signal destructively interfere in an optimal way, the feedback microphone signal will detect a null due to the fact that the noise energy and anti-noise energy are optimally cancelling each other.

In one embodiment, the amplitude of the combined anti-noise signal 50 can be adjusted based on the feedback microphone signal. Alternatively, the amplitudes and phase of each frequency band segment can be individually adjusted. This may be done by comparing the amplitude and phase of the signal stream at the feedback point to the input signal and adjusting the anti-noise parameters Alternatively, the frequency content and amplitude of the feedback signal itself can be examined to indicate the adjustments required to the anti-noise parameters to improve the results by making fine-tuning adjustments to the frequency dependent delay time 46 and amplitude for each segment.

Determination of the Frequency Dependent Delay Time

The signal processing circuit 10 calculates the frequency-dependent time delay for each segment by taking into account a number of factors. One of these factors is a calculated 180 degree phase shift time that is associated with the predetermined frequency (e.g., the segment center frequency) for each individual signal segment.

This calculation may be done in calibration mode and stored in a table in memory 12, or recalculated continuously in real time, depending on the application and the available processing power. The exact time delay required to create the appropriate anti-noise for each frequency "f" is calculated by the formula: (1/f)/2. That is:

$$t_d = \frac{1}{2f}$$

where f is the predetermined frequency (e.g., center frequency) for that segment Another factor used by the signal processing circuit is the system offset time, which is in turn dependent on two factors, the in-air propagation time and the system propagation time.

To generate precise noise cancelling signals the processing circuit relies on a priori knowledge of the rate of in-air sound propagation, measured as the transit time for a signal to travel from an input microphone to the feedback microphone. As used herein this transit time is referred to as the in-air propagation time. The processing circuit also relies on a priori knowledge of the time it takes for the processor 10 and associated input and output components (for example: 14, 16, 18, 20, 22, 24) to generate the noise cancelling signal, referred to herein as the system propagation time. These data are needed to ensure that the noise cancelling signal is precisely phase-matched with the noise signal so that perfect cancellation results. The rate at which the noise signal propagates through the air is dependent on a variety of physical factors, such as air temperature, pressure, density and humidity. Processor calculation time and circuit throughput time is dependent on the speed of the processor, the speed of the bus accessing the memory 12 and the signal delays through input/output circuits associated with the processor 10 in the various embodiments.

In the preferred embodiment, these in-air propagation and system propagation times are measured and stored in memory 12 during a calibration mode. The calibration mode can either be manually requested by a user via the user interface, or the processor 10 can be programmed to automatically perform calibration periodically or in response to measured air temperature, pressure, density and humidity conditions.

Thus the preferred embodiment measures the in-air propagation time from when the noise signal is detected at the input microphone 14 until it is later detected at the feedback microphone 26. Depending on the application, these two microphones may be disposed at a permanently fixed separation distance (such as in the headset embodiment of FIG. 2), or they may be disposed at a separation distance that depends on where the two microphones happened to be placed in the field. The time delay attributed to the time taken for the input signal to be processed, output to the speaker system 24 (24a), and received at the feedback microphone 26 corresponds to the system propagation time.

Once the in-air and system propagation times are measured and stored in calibration mode, the signal processing circuit 10 calculates a system offset time as the arithmetic difference between the in-air propagation time and the system propagation time. This difference calculation can also either be calculated in real time or stored in memory 12. In some fixed applications like headphones, there may be no need for an on-board calibration mode as calibration may be done on the production line or established based on known fixed geometry of the headphones. The system offset time may be stored as a constant (or dynamically calculated in some applications) to be used in the noise reduction calculations described herein.

For each discrete frequency segment to be processed, the anti-noise signal is created by delaying the processed signal by a time equal to the absolute value of: the 180 degree phase shift time for that discrete frequency segment minus the system offset time. This value is referred to herein as the applied time delay. The applied time delay for each frequency segment can either be stored in a table or continuously calculated in various implementations of the algorithm.

Figure 7:
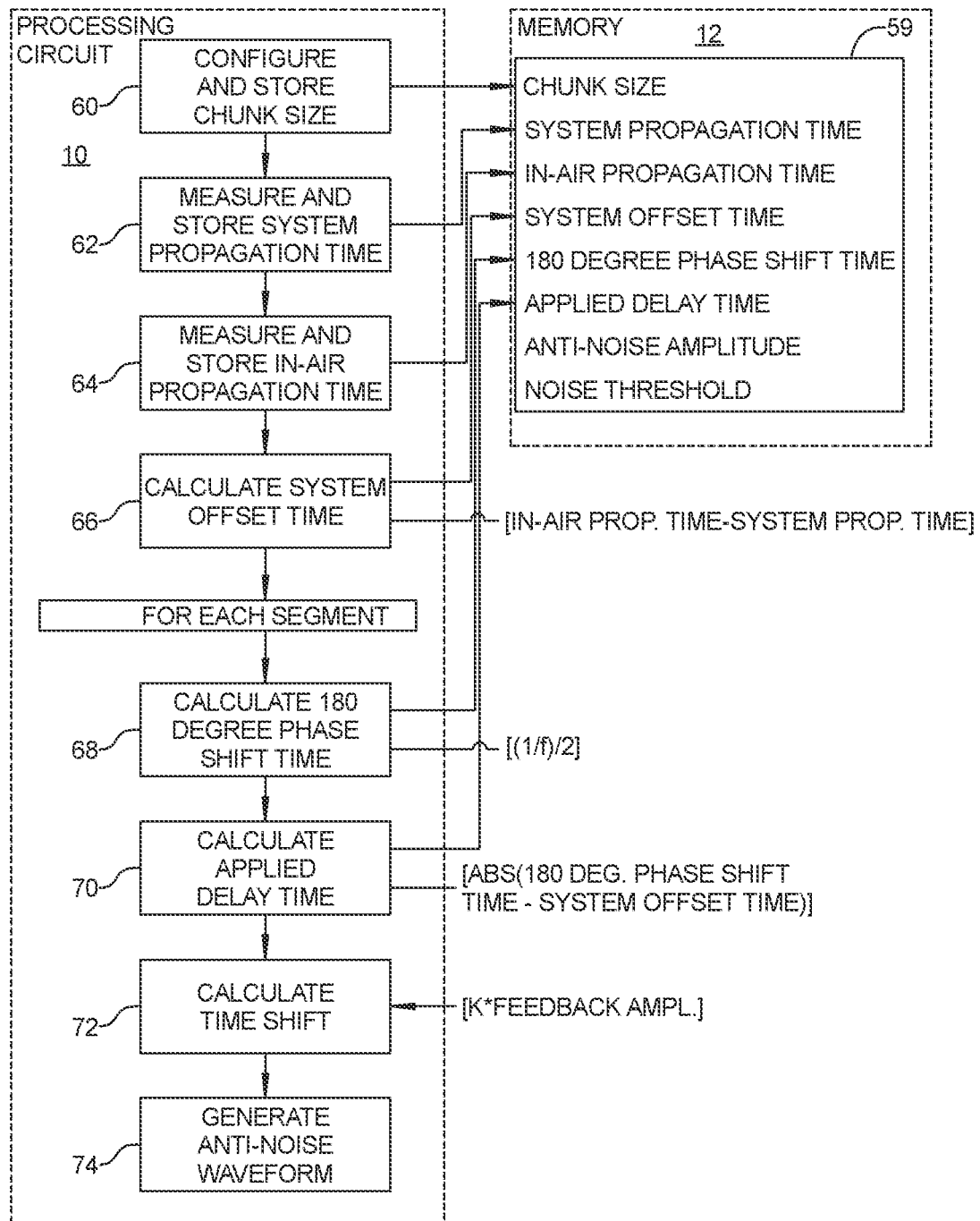
FIG. 7 is a flowchart diagram further illustrating a manner of programming a digital processor circuit to perform the core engine algorithm used in the silencer device.

FIG. 7 illustrates in greater detail the manner in which a signal processing circuit may be programmed to implement the core engine noise cancelling algorithm. The programmed process begins with a series of steps that populate a set of data structures 59 within the memory 12, where the parameters used by the algorithm are stored for access as needed. Further details of the core engine process are also discussed later below in connection with FIG. 10.

Referring to FIG. 7, first a record containing the selected chunk size is stored in data structure 59. The chunk size is the length of the time slice to be processed in each iteration performed by the core engine, as represented by the number of samples to be processed as a group or "chunk" of data. The chunk size is primarily based upon the application (frequency range to be processed and the resolution required), the system propagation time, and the travel time between input and output for the noise signals which are transmitted in-air or otherwise (processing must be completed and the anti-noise injected into the signal stream before the original signal passes the anti-noise output point).

For example, for an in-air system processing the entire audio spectrum, a distance between the input and output microphones of 5.0", a sampling rate of 48 kHz, and a system propagation time of 0.2 ms; a chunk size of 16 would be appropriate (at a 48 kHz sampling rate, 16 samples is the equivalent of ~0.3333 ms in time; and at standard temperature and pressure, sound travels ~4.5" in-air during that amount of time). Processor operation can be optimized for the efficient processing of the desired chunk size by limiting system calls and state changes to once per chunk.

This chunk size record is typically stored at the outset, when the noise cancellation device is configured for a given application. In most cases, it is not necessary or desirable to alter the chunk size record while the core engine noise cancelling algorithm is operating.

The frequency band ranges, segment sizes within each frequency band range, and output scaling factor for each frequency band are set as initial conditions depending upon the application, and stored in data structure 59. These parameters can be set in a User Interface, included as presets in a system, or dynamically calculated.

Next, the processing circuit at 62 measures and stores in data structure 59 the system propagation time corresponding to the time consumed by the processing circuit and its associated input and output circuits to perform the noise abatement processes. This is done by operating the processing circuit in a calibration mode, described below, where a noise signal is supplied to the processing circuit, acted upon by the processing circuit to generate the anti-noise signal and output. The time elapsed between input of the noise signal until output of the anti-noise signal represents the system propagation time. This value is stored in the data structure 59.

In addition, the processing circuit at 64 measures and stores in data structure 59 the in-air propagation time. This operation is also performed by the processing circuit in the calibration mode discussed below. In this case, the processing circuit is switched to a mode where it does not generate any output. The elapsed time between reception of a signal at the input microphone and the reception of the signal at the feedback microphone is measured and stored as the in-air propagation time.

Next, the processing circuit at 66 calculates and stores in data structure 59 the system offset time, defined as the in-air propagation time minus the system propagation time. This value is needed later when the processing circuit calculates the applied delay time.

With the foregoing calibration parameters thus calculated and stored, the core engine noise cancelling algorithm can now perform the segment specific pre-calculations (alternatively, these calculations can be made in real time provided there is sufficient processing power available).

As illustrated, step 68 and the subsequent steps 70 and 72 are performed in parallel (or rapidly in series) for each segment according to the frequency band settings. If there are 1000 segments for the given application, then steps 68-70 are performed 1000 times, preferably in parallel, and the data is stored in data structure 59.

At step 70, the 180 degree phase shift time is then adjusted by subtracting the previously stored system offset time for each segment. The processor circuit calculates and stores the absolute value of this value as the applied delay time—thus the applied delay time is a positive number, representing the amount of phase shift to be applied to the corresponding segment.

The core engine uses this stored data to process frequency segments more quickly (by applying pre-calculated time shifts for all frequency segments in advance). The processor circuit at step 72 performs the phase shifting of the segment noise signal by time shifting the segment noise signal by the amount stored as the applied delay time for that segment. In addition, if an amplitude adjustment (or fine tuning phase adjustment) is required according to the frequency range settings or the feedback processing 52 (FIG. 6) that adjustment is also applied here (in some embodiments, the phase shift and amplitude adjustment can be applied simultaneously by storing the information as a vector). All of the segments are processed in parallel, or rapidly in series, depending upon the system architecture.

Once all of the segments for a particular chunk have been adjusted appropriately, the processing circuit at 74 then recombines all of the processed segments to generate the anti-noise waveform for outputting into the signal stream.

Figure 8:
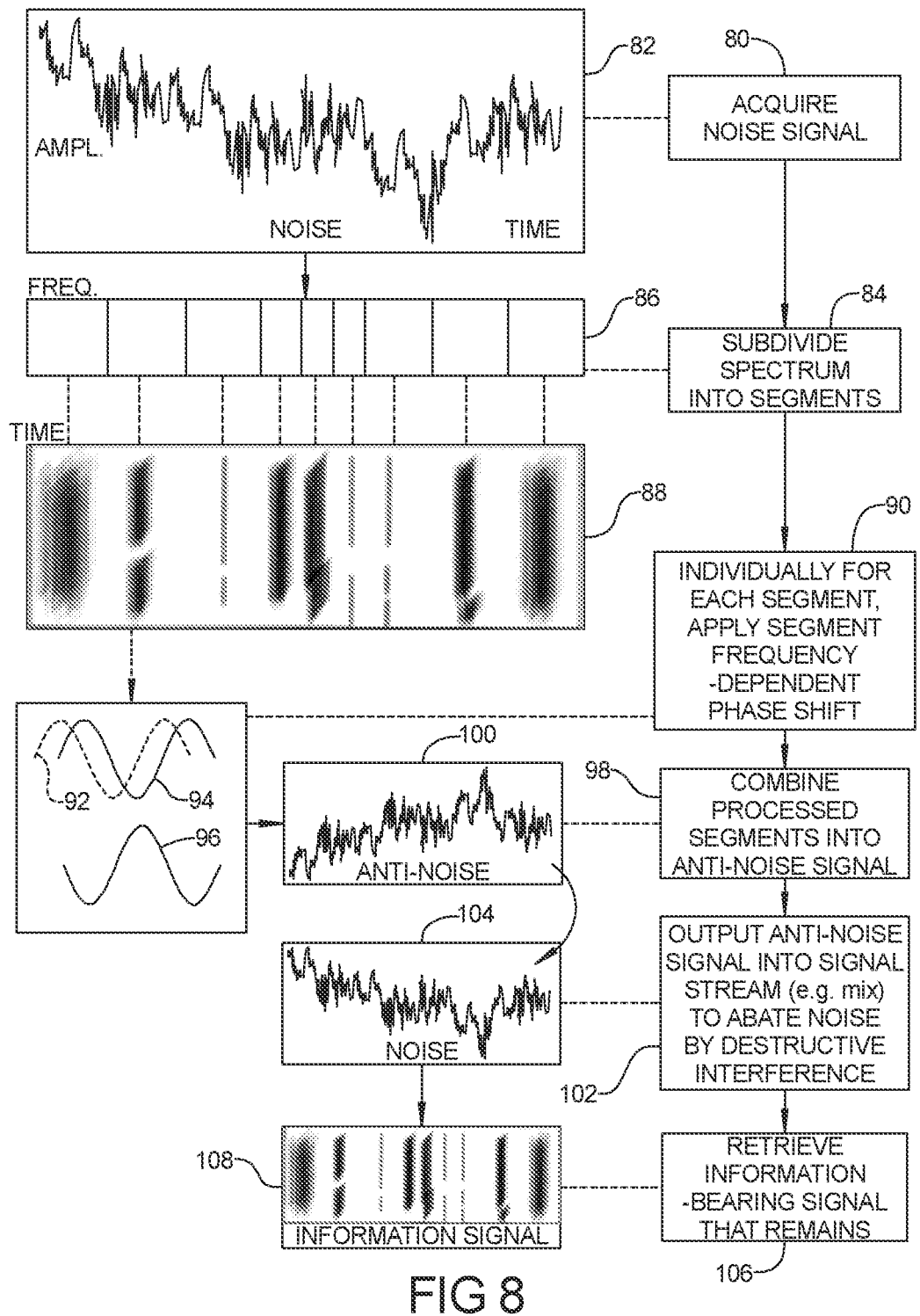
FIG. 8 is a signal processing diagram illustrating processing techniques implemented by the core engine algorithm of FIG. 6.

For a further understanding of the process being performed by the processing circuit, refer now to FIG. 8, which gives a more physical representation of how the noise signal is processed. Beginning at step 80, the noise signal 82 is acquired. In FIG. 8, the noise signal is plotted as a time-varying signal comprising many different frequency components or harmonics.

At step 84, a chunk of the noise signal spectrum is subdivided into segments 86, according to the parameters 59 discussed in connection with FIG. 7. For illustration purposes, it is assumed in FIG. 7 that the time varying noise signal 82 has been expressed in the frequency domain, where lowest frequency components are allocated to the left-most side of the spectrum plot 86, while the highest frequency components or harmonics are allocated to the right-most side of the spectrum plot. For example, the spectrum plot 86 might span from 20 Hz. to 20,000 Hz, covering the generally accepted full range of human hearing. Of course, the spectrum can be allocated differently depending on the application.

It should be recognized that although the noise signal has been represented in the frequency domain in the spectrum 86, the noise signal is by nature a time varying signal. Thus the amount of energy in each frequency domain segment will fluctuate with time. To illustrate this fluctuation, a waterfall plot 88 is also depicted, showing how the energy within each frequency segment can vary as time flows along the vertical axis.

Individually for each segment, as at step 90, the frequency-dependent phase shift (i.e., the applied delay time) is applied. To illustrate this, the waveform 92 represents a noise frequency within the segment before shifting. Waveform 94 represents the same noise frequency after the system offset time has been applied. Finally, waveform 96 represents the resultant noise frequency after the 180 degree phase shift time has been applied (note this is for illustrative purposes only—in actual processing only the applied delay time is applied, which is the absolute value of the 180 degree phase shift time minus the system offset time). For this illustration, it is also assumed that no amplitude scaling is required for the segments being processed.

By combining the time shifted components from each segment at step 98, the anti-noise signal 100 is constructed. When this anti-noise signal is output into the signal stream, as at step 102, the anti-noise signal 100 is mixed with the original noise signal 104 causing the two to destructively interfere, effectively cancelling or abating the noise signal. What remains is any information-bearing signal 108 that can be retrieved at step 106.

Calibration Mode

Figure 9:
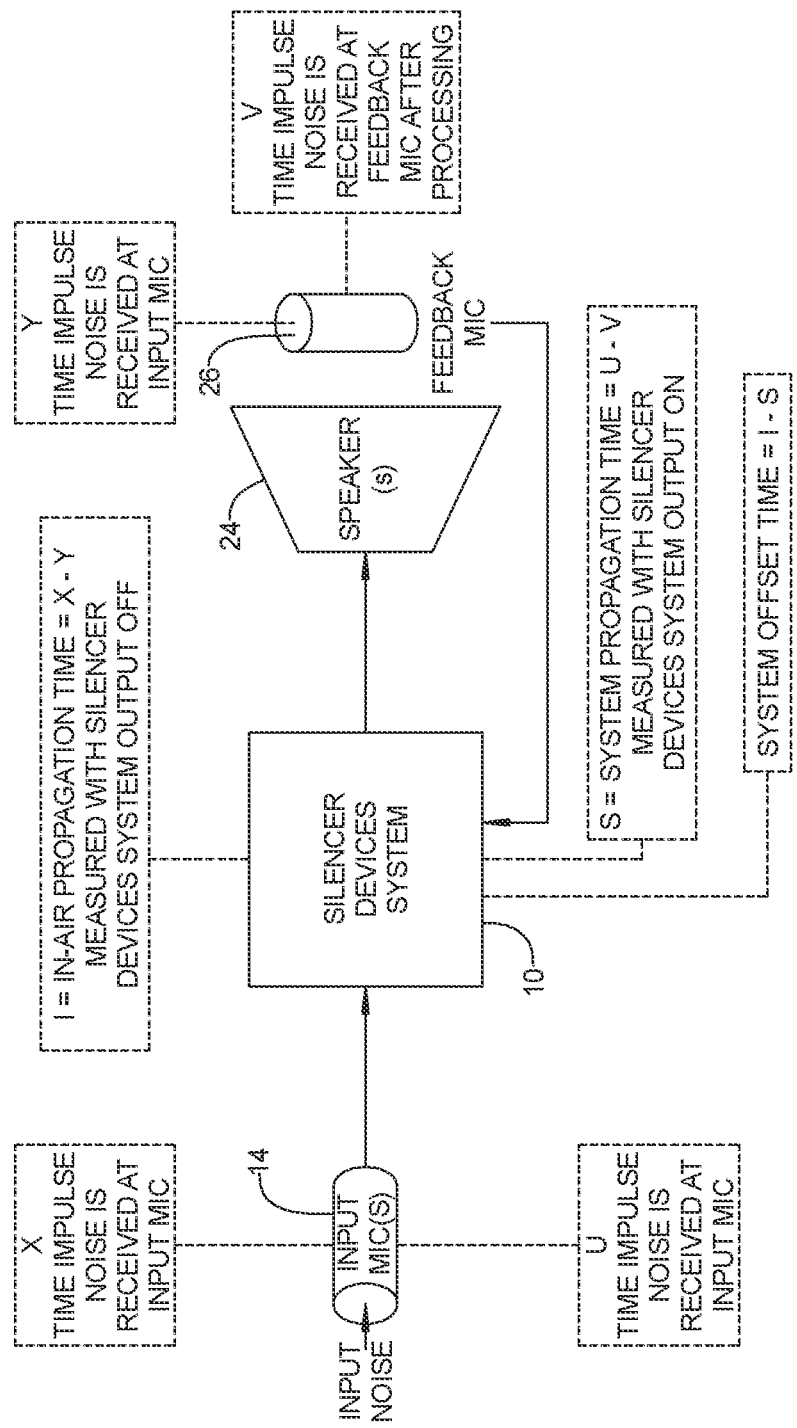
FIG. 9 is a detailed signal processing diagram illustrating the calibration mode used in connection with the core engine algorithm.

FIG. 9 illustrates how the processing circuit 10, input microphone 14, amplified loudspeaker 24 and feedback microphone 26 may be utilized to effect calibration, by selectively enabling and disabling the core engine algorithm as measurements are taken.

In a presently preferred embodiment the in-air propagation time is calculated with the core engine anti-noise system and output disabled. In this state the in-air propagation time is calculated as the difference in time between when the input noise is captured at the input microphone 14 input and the time the noise is captured at the feedback microphone 26. System propagation time is measured with the core engine anti-noise system enabled. The same input is again introduced to the input microphone 14. This time it is processed by the core engine, and output via a speaker (e.g. loudspeaker system 24 or other suitable calibration speaker or transducer) placed before the feedback microphone 26. While processing the input signal in the core engine, its frequency can be altered so that the output impulse will be distinguished from the input impulse noise (or the timing/phase of the two signals can be used to distinguish the system output from the original noise). Both the in-air and system generated signals will reach the feedback microphone. The system propagation time can then be calculated from the time of the input impulse signal to reach the feedback mic and the time of the output signal to reach the feedback mic.

Note that this calibration mode can virtually eliminate the significant amount of engineering time required for "tuning" the system to account for minute variations among microphones used in or the physical geometry of noise cancelling headphone or earbud systems. This can result in dramatic product development cost savings. The calibration mode also solves the physical challenges of tuning individual sets on the production line due to individual component production tolerances and variations (especially in the microphones), by providing an automated method of initial tuning. This is another dramatic cost savings in production.

Using the system offset time, the processor calculates a specific segment time delay that will be applied to each segment to create the precise anti-noise required for the segment. To calculate the precise segment time delay, the processor ascertains the time required to produce a 180 degree phase shift in the center frequency of the particular frequency segment and adjusts that by the system offset time. Specifically, the segment time delay is calculated as the absolute value of [the 180 degree phase shift time minus the system offset time].

After all of the anti-noise segment time delays are calculated, the digital signals for each segment are then time delayed by the calculated amount for that segment, and all of the anti-noise segments so generated are then assembled into a single anti-noise signal which is then output (such as to the speaker system).

In embodiments that employ the feedback microphone, or other source of a feedback signal, the processor 10 compares the feedback microphone input signal with the input microphone input signal in both phase and amplitude. The processor uses the phase comparison to adjust the applied delay time and uses the anti-noise amplitude to adjust the amplitude of the generated noise cancelling signal. In adjusting amplitude, the processor can manipulate amplitude individually for each segment in a frequency band range (and thus effectively controlling the amplitude for each segment). Alternatively, the frequency composition and amplitude of the feedback signal itself can be used to determine the necessary adjustments to the amplitude and phase of each segment.

Details of Core Engine Process

Figure 10:
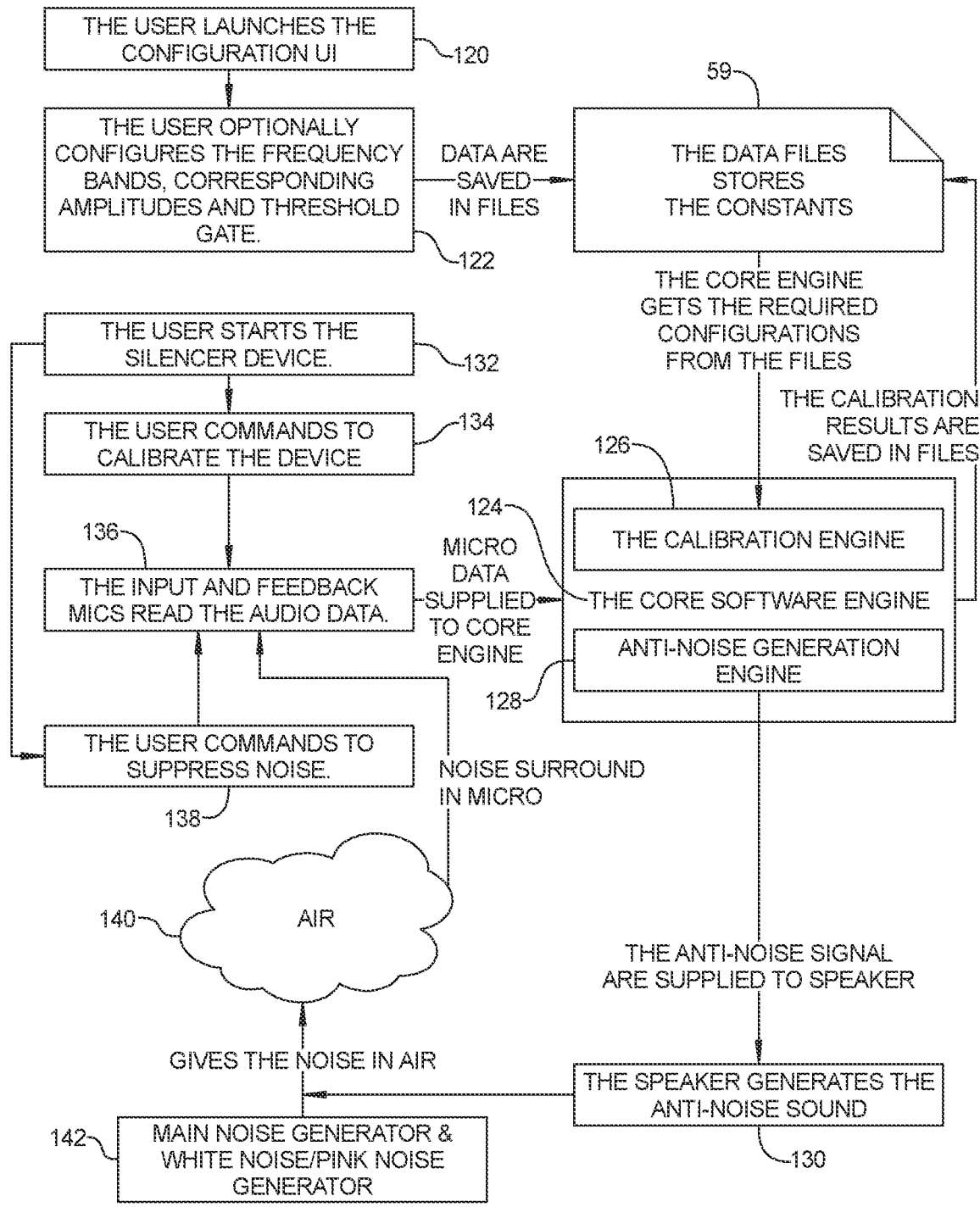
FIG. 10 is a core engine process diagram.

Referring now to FIG. 10, a detailed explanation of how the signal processing circuit 10 implements the core engine process. Specifically FIG. 10 details the software architecture implemented by the signal processing circuit in a preferred embodiment. The user is able to interact with the processor running the core engine process in a number of ways. If desired, the user can launch the configuration mode of the silencing device as at 120. By so doing, the user may also optionally configure the frequency bands and corresponding segment widths and amplitudes, as well as the noise threshold gate parameter (part of the data structure 59 (see also FIG. 7). The chunk size can also be set as a user interface parameter.

Alternatively, the user may simply start the silencer device as at 132. In so doing the user can command the core engine process to calibrate the device as at 134. The calibration process causes the core engine software 124 to effect the calibration process by invoking the calibration engine 126, a part of the core engine software 124 running on the signal processing circuit, performs the calibration process detailed above, thereby populating data structure 59 with the in-air propagation time, system propagation time, and other calculated parameters. These stored parameters are then used by the anti-noise generation engine 128, also forming part of the core engine software 124. As illustrated, the anti-noise generation engine 128 supplies signals to the loudspeaker, which then introduces the anti-noise signal into the signal stream as at 130.

Whether required as part of the calibration process or as part of the noise abatement process during use, the core engine inputs the signals from the input microphone and the feedback microphone as at 136. For noise abatement during use, the user commands the device to suppress noise via the user interface as at 138. As illustrated, this causes the anti-noise signal to be introduced into the signal stream (e.g., into the air 140). If utilized, white noise or pink noise can also be introduced into the signal stream as at 142.

Figure 11:
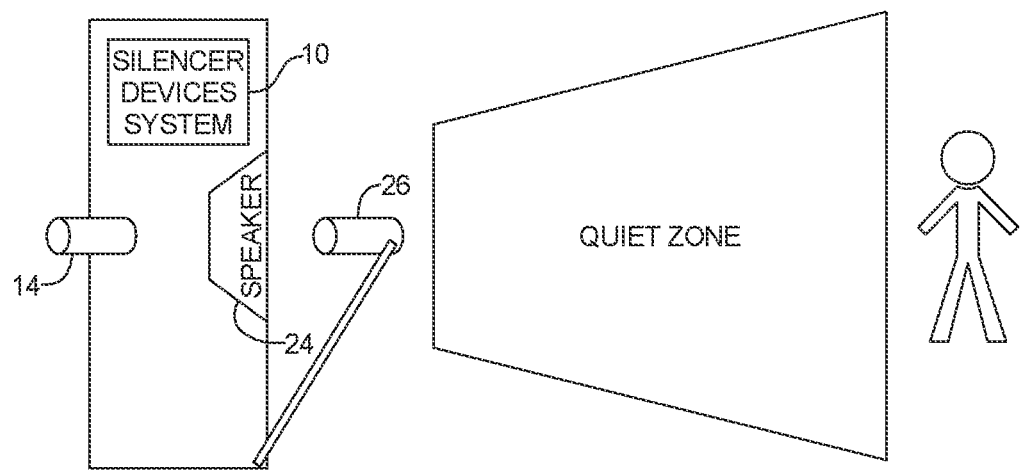
FIG. 11 is an exemplary low power, single-unit, in-air silencer system configured as a desktop personal quiet zone system.

To further illustrate how the signal processing circuit running the core engine algorithm operates upon exemplary input data, refer to the Table below. In the table below, exemplary user-defined frequency ranges are specified. As can be seen, the applied time delay can be represented as a floating point number corresponding to the delay time in seconds. As the data show, typical applied time delays can be quite small, yet each applied time delay is precisely calculated for each given frequency segment.

embodiments are possible. These include a low power, single-unit system optimized for providing a personal quiet zone. As shown in FIG. 11, the components depicted in FIG. 1 are mounted in a desktop or table top box containing the amplified speaker, which is directed to the user. Note the feedback microphone 26 is disposed within the sound field of the speaker. This can be in a fixed configuration, or can deploy a detachable extension arm that also functions as a mic stand to allow the user to place the feedback microphone closer to where the user is situated. Another likely embodiment is to have the silencer system encoded into a smart phone or added as an smart phone App. In this embodiment, the phone's built-in mics and speakers as well as a mic from a headset can be utilized to create the system.

| Sample Width (Hz) | Center Frequency (Hz) | Delay Time for 180° Phase Shift (= period/2) | In Air Propagation Time | System Propagation Time | Off Set Value | Applied Time Delay = \| 180° Time − Off Set Value \| | Example of a User Defined Frequency Range |
|---|---|---|---|---|---|---|---|
| 32 | 16 | 0.03125 | 0.00088811 | 0.00000001 | 0.0008881 | 0.0303619 | 1 |
| 32 | 48 | 0.010416667 | 0.00088811 | 0.00000001 | 0.0008881 | 0.009528567 | 1 |
| 32 | 80 | 0.00625 | 0.00088811 | 0.00000001 | 0.0008881 | 0.0053619 | 1 |
| 32 | 112 | 0.004464286 | 0.00088811 | 0.00000001 | 0.0008881 | 0.003576186 | 1 |
| 32 | 144 | 0.003472222 | 0.00088811 | 0.00000001 | 0.0008881 | 0.002584122 | 1 |
| 32 | 176 | 0.002840909 | 0.00088811 | 0.00000001 | 0.0008881 | 0.001952809 | 1 |
| 32 | 208 | 0.002403846 | 0.00088811 | 0.00000001 | 0.0008881 | 0.001515746 | 1 |
| 32 | 240 | 0.002083333 | 0.00088811 | 0.00000001 | 0.0008881 | 0.001195233 | 1 |
| 32 | 272 | 0.001838235 | 0.00088811 | 0.00000001 | 0.0008881 | 0.000950135 | 1 |
| 32 | 304 | 0.001644737 | 0.00088811 | 0.00000001 | 0.0008881 | 0.000756637 | 1 |
| 32 | 336 | 0.001488095 | 0.00088811 | 0.00000001 | 0.0008881 | 0.000599995 | 1 |
| 32 | 368 | 0.001358696 | 0.00088811 | 0.00000001 | 0.0008881 | 0.000470596 | 1 |
| 32 | 400 | 0.00125 | 0.00088811 | 0.00000001 | 0.0008881 | 0.0003619 | 1 |
| 16 | 416 | 0.001201923 | 0.00088811 | 0.00000001 | 0.0008881 | 0.000313823 | 2 |
| 16 | 432 | 0.001157407 | 0.00088811 | 0.00000001 | 0.0008881 | 0.000269307 | 2 |
| 16 | 448 | 0.001116071 | 0.00088811 | 0.00000001 | 0.0008881 | 0.000227971 | 2 |
| 15 | 454 | 0.001077586 | 0.00088811 | 0.00000001 | 0.0008881 | 0.000189486 | 2 |
| 15 | 480 | 0.001041667 | 0.00088811 | 0.00000001 | 0.0008881 | 0.000153567 | 2 |
| 16 | 496 | 0.001008065 | 0.00088811 | 0.00000001 | 0.0008881 | 0.000119965 | 2 |
| 16 | 512 | 0.000976563 | 0.00088811 | 0.00000001 | 0.0008881 | 8.84625E−05 | 2 |
| 8 | 8,448 | 5.91856E−05 | 0.00088811 | 0.00000001 | 0.0008881 | 0.000828914 | 5 |
| 8 | 8,456 | 5.91296E−05 | 0.00088811 | 0.00000001 | 0.0008881 | 0.00082897 | 5 |
| 8 | 8,464 | 5.90737E−05 | 0.00088811 | 0.00000001 | 0.0008881 | 0.000829026 | 5 |
| 8 | 8,472 | 5.90179E−05 | 0.00088811 | 0.00000001 | 0.0008881 | 0.000829082 | 5 |
| 8 | 8,480 | 5.89623E−05 | 0.00088811 | 0.00000001 | 0.0008881 | 0.000829138 | 5 |
| 8 | 8,488 | 5.89067E−05 | 0.00088811 | 0.00000001 | 0.0008881 | 0.000829193 | 5 |
| 8 | 8,496 | 5.88512E−05 | 0.00088811 | 0.00000001 | 0.0008881 | 0.000829249 | 5 |
| 8 | 8,504 | 5.87959E−05 | 0.00088811 | 0.00000001 | 0.0008881 | 0.000829304 | 5 |
| 8 | 8,512 | 5.87406E−05 | 0.00088811 | 0.00000001 | 0.0008881 | 0.000829359 | 5 |
| 8 | 8,520 | 5.86854E−05 | 0.00088811 | 0.00000001 | 0.0008881 | 0.000829415 | 5 |
| 16 | 8,536 | 5.85754E−05 | 0.00088811 | 0.00000001 | 0.0008881 | 0.000829525 | 6 |
| 16 | 8,552 | 5.84659E−05 | 0.00088811 | 0.00000001 | 0.0008881 | 0.000829634 | 6 |
| 16 | 8,568 | 5.83567E−05 | 0.00088811 | 0.00000001 | 0.0008881 | 0.000829743 | 6 |
| 16 | 8,584 | 5.82479E−05 | 0.00088811 | 0.00000001 | 0.0008881 | 0.000829852 | 6 |
| 16 | 8,600 | 5.81395E−05 | 0.00088811 | 0.00000001 | 0.0008881 | 0.00082996 | 6 |

In contrast with conventional noise cancellation techniques, the core engine noise cancellation algorithm enables exceptional results for frequencies above 2,000 Hz, and facilitates achieving good results across the entire audio spectrum (up to 20,000 Hz) and beyond (provided there is sufficient processing speed). Conventional techniques being deployed currently are reasonably effective only up to approximately 2,000 Hz, and are essentially ineffective above 3,000 Hz.

Different Use Case Embodiments

The basic technology disclosed above can be put to a wide variety of different uses. The following will describe some of these use cases.

In-Air Silencer System (Audio) Embodiments

Figure 12:
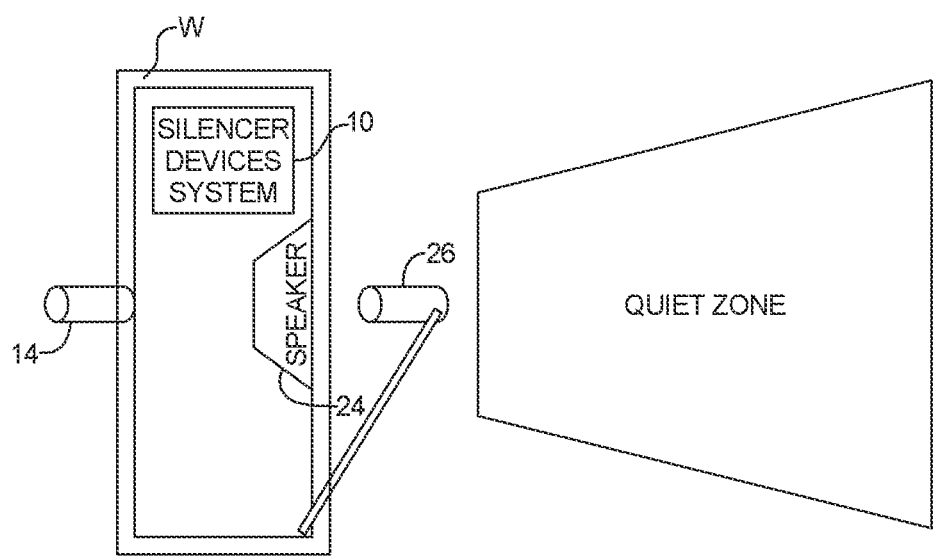
FIG. 12 is an exemplary low power, single-unit, in-air silencer system configured as a window mounted unit.

The in-air silencer system can be implemented as illustrated in FIG. 1 and described above. Several different FIG. 12 shows an alternate embodiment where the components of FIG. 1 are deployed in a mounting frame adapted to fit within a room window, the window frame being shown at W. In this embodiment, the input microphone 14 captures sound from outside the window and the amplified speaker 24 introduces the anti-noise audio into the room. The feedback microphone can be situated on an extension arm, or placed conveniently near the user. If desired, the feedback microphone can communicate wirelessly with the processing circuit 10 using Bluetooth or other wireless protocol. In this embodiment, amplitude adjustments for the various frequency band ranges determined in calibration model would likely be significant (as in the headphone embodiment) because of the way the walls and windows impact the original noise.

Figure 13:
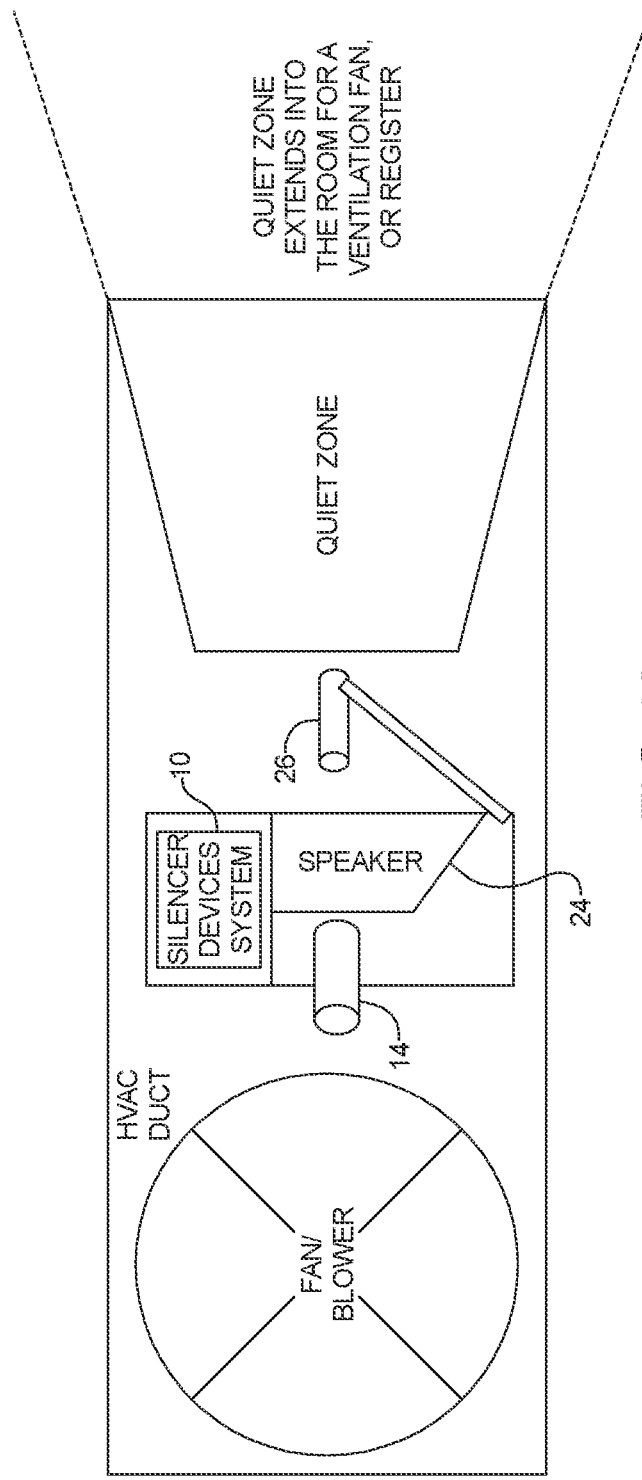
FIG. 13 is an exemplary low power, single-unit, in-air silencer system configured as an air plenum mounted package.

FIG. 13 shows another embodiment where the components of FIG. 1 are deployed in a plenum mounting package adapted to fit within an air duct of an HVAC system, or within the duct of a fan system (e.g., bathroom ceiling fan, kitchen ventilation fan, industrial venting fan, or the like). In this embodiment the sounds generated by the HVAC system or fan system are sampled by input microphone 14 and the anti-noise signal is injected into the air duct system. In this embodiment, if desired, several speaker systems can be deployed at the ventilation registers throughout the home or building, so that the HVAC or fan system noise is further abated at each location. Such a multi-speaker embodiment may employ individual feedback microphones 26 within each room, such as adjacent each register. The processing circuit 10 can supply an amplifier volume control signal individually to each amplified speaker, to tailor the sound pressure level of the anti-noise signal for each room. Rooms that are closer to the noise-producing blower may require higher amplification of the anti-noise signal than rooms located further away. Alternatively, an individual device can be mounted in individual registers to provide location specific control.

A second class of in-air silencer devices comprise high-power, multi-unit systems designed to abate noise coming from high energy sources. These include systems to abate noise created at construction sites, noise created along busy streets or highways, noise created by nearby airports. These same high-power, multi-unit systems can also be adapted to school perimeter and stadium noise abatement. In addition high-power multi-unit systems can be used to abate road noise in vehicle cabins (e.g., cars, trucks, military tanks, boats, planes, etc.)

Figure 14:
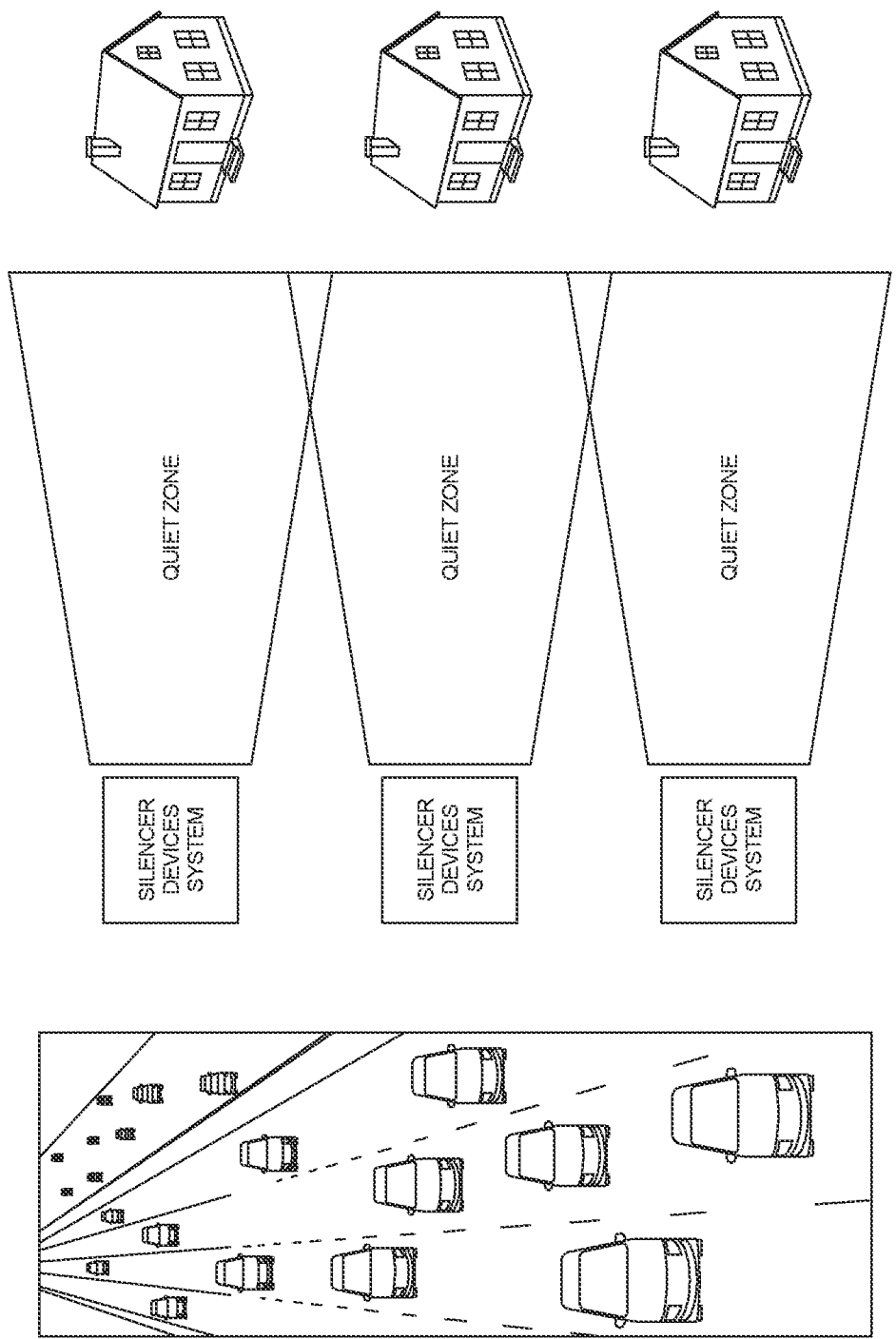
FIG. 14 is an exemplary high power, multi-unit, in-air silencer system configured for highway noise abatement.

FIG. 14 shows an exemplary high-power, multi-unit system deployed for highway noise abatement. The individual silencer devices, each implemented as shown in FIG. 1, are positioned, so that they intercept the highway noise using their respective input microphones 14 and inject anti-noise audio energy into the environment so that the highway noise is cancelled through destructive interference at the subdivision located a distance away. Alternatively, the silencer device can be located directly in the yard of a home to provide more direct coverage.

In the highway noise abatement embodiment, the individual silencer devices are preferably mounted on vertical stands or other suitable structure, so that the speakers are well above the heads of any persons standing nearby. The feedback microphones 26 may be placed a considerable distance from the silencer device, using WiFi communication or other wireless communication protocol to send feedback information to the processing circuit.

Also, if desired, the individual silencer devices may be wirelessly joined in a network, such as a mesh network or a local area network, allowing the silencer devices to share information about local sound input signals and feedback signals obtained by each silencer device unit. In the case of highway noise, loud noise sources can be tracked by the input microphones of the respective silencer devices. Thus as a semi-truck air braking, or a motorcycle with ineffective muffler motors along a stretch of noise-protected highway, the collective system of silencer devices can communicate with each other and adapt their respective anti-noise signals to augment what is otherwise possible using individual input and feedback microphones. This implements a form of diversity noise cancellation made possible by the fact that two different, mathematically orthogonal information sources are being used: (a) the feedback microphone sources and (b) the collective input microphones shared via the mesh network or local area network.

Figure 15:
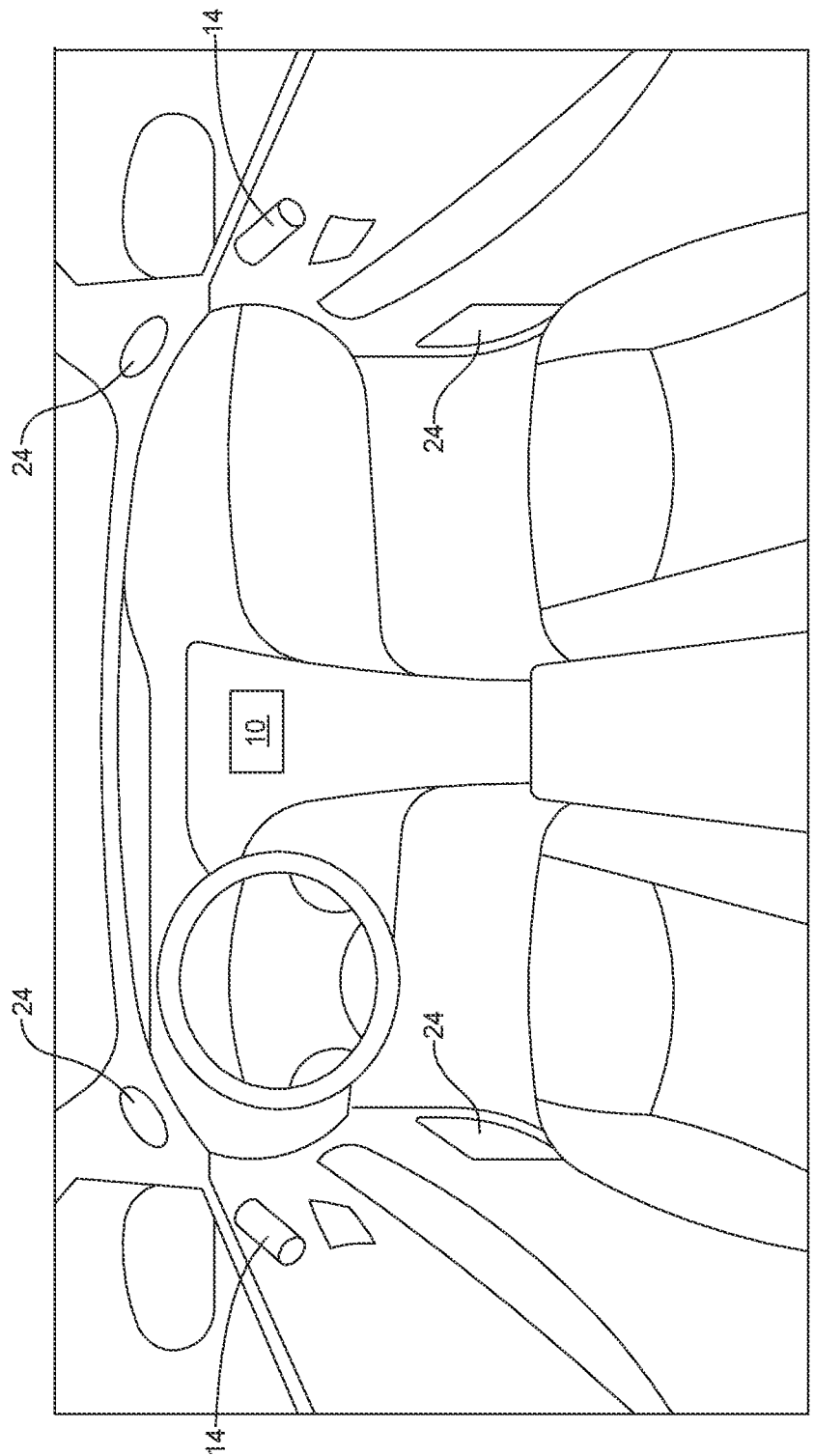
FIG. 15 is an exemplary high power, multi-unit, in-air silencer system configured to abate noise in a vehicle.

FIG. 15 illustrates how the high-power, multi-unit system may be deployed in a vehicle, such as an automotive vehicle. Multiple input microphones are placed at noise entry locations within the cabin. These input data are processed individually, either using plural cores of a multi-core processor 10 or using plural processors 10 (shown as an icon on the car's infotainment screen here, representing the case where the system is installed at the factory and embedded in the car's electronics. Because each input signal is processed individually, it is not necessary that each signal be segmented in the same way. Indeed, each different type of noise signal will typically have its own noise signature (tire noise is quite different from muffler noise, for example). Thus each input signal is segmented in a manner that best suits the frequency spectrum and sound pressure levels at each different noise site to provide the desired results at each passenger location.

While dedicated anti-noise speakers can be used within the cabin of the vehicle, it is also possible to use the sound system already present in the vehicle. Thus in the illustrated embodiment the processing circuit 10 supplies a stereo or alternatively a surround sound audio signal that is mixed with the audio coming from the in-cabin entertainment system. Mixing can be performed either in the digital or audio domain. However, in either case, the processing circuit 10 receives a data signal supplying the processing circuit with information about what volume level the user has selected for the entertainment system. The processor uses this information to adjust the volume of the anti-noise signal so that it will properly counteract the noise sources regardless of what volume level the user has selected for the entertainment system. Thus as the user turns the entertainment volume level up, processing circuit 10 reduces the anti-noise signal injected into the mixer to compensate. The processor is programmed to ensure that the correct anti-noise sound pressure levels are generated within the cabin, regardless of how the user has happened to set the entertainment audio level.

Figure 16:
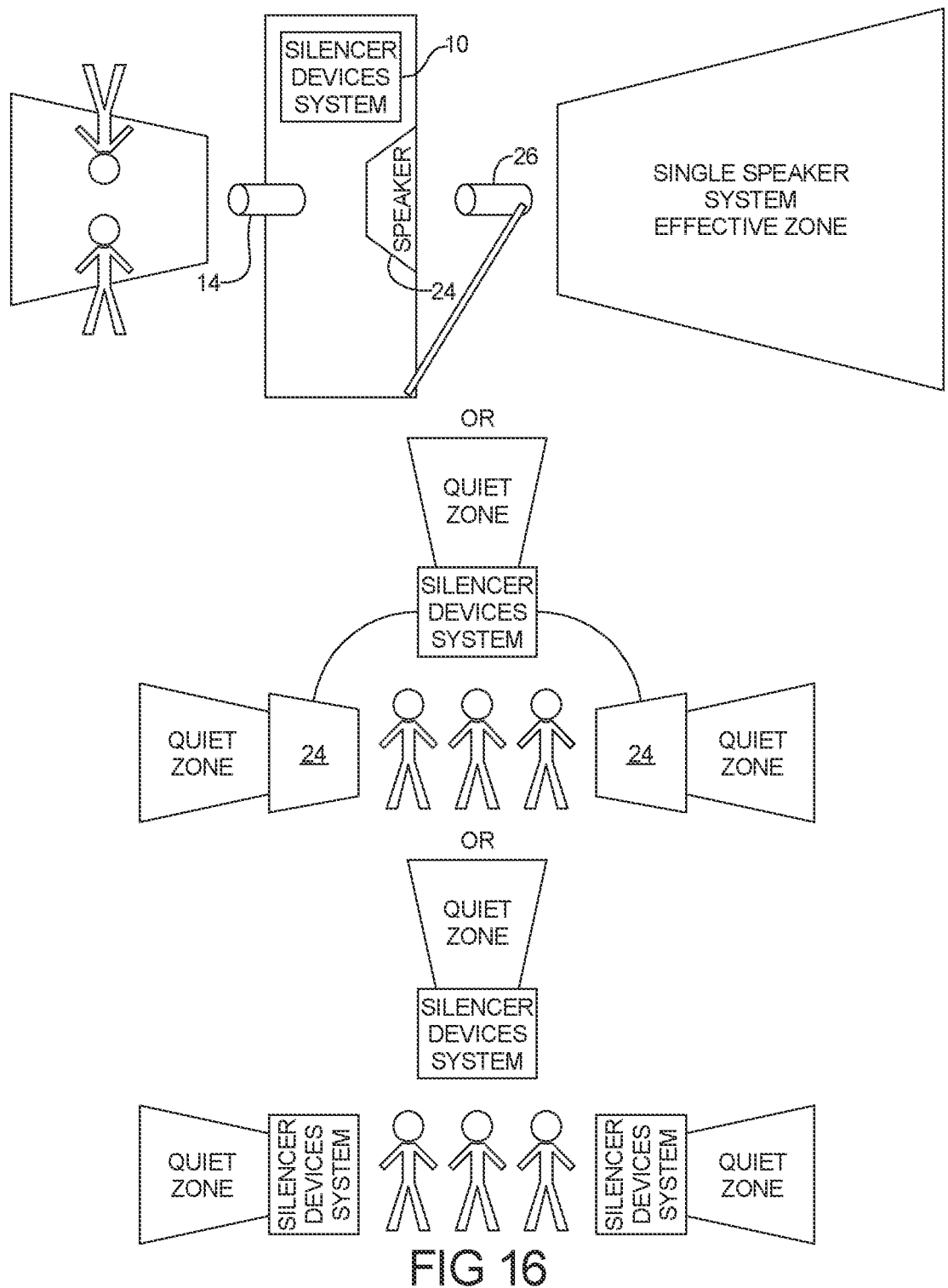
FIG. 16 is an exemplary high power, multi-unit, in-air silencer system configured to create a cone of silence for protecting a private conversation from being overheard by others.

Yet another class of in-air silencer system provides an inverse in-air function. In this type of system, the silencer system is configured in reverse, to create a "cone of silence" that allows a private conversation to take place publicly, without others being able to clearly hear what is being said. Shown in FIG. 16, The silencer device is deployed with one or more outwardly facing speakers. The input microphones are disposed at the center of the speaker arrangement, thus placing the persons in private conversation on the "noise input" side of the audio stream. In this embodiment the feedback microphones 26 are deployed at locations where third party listeners (uninvited listeners) cannot readily occlude these microphones and thus alter the anti-noise signal being generated to cancel out that conversation.

Telecommunications Microphone, Telecommunications Headset and Personal Headphones/Earbuds (Audio)

The Telecommunications/Headphone system can be implemented as illustrated in FIG. 2 and described above. Several different embodiments are possible.

Figure 17:
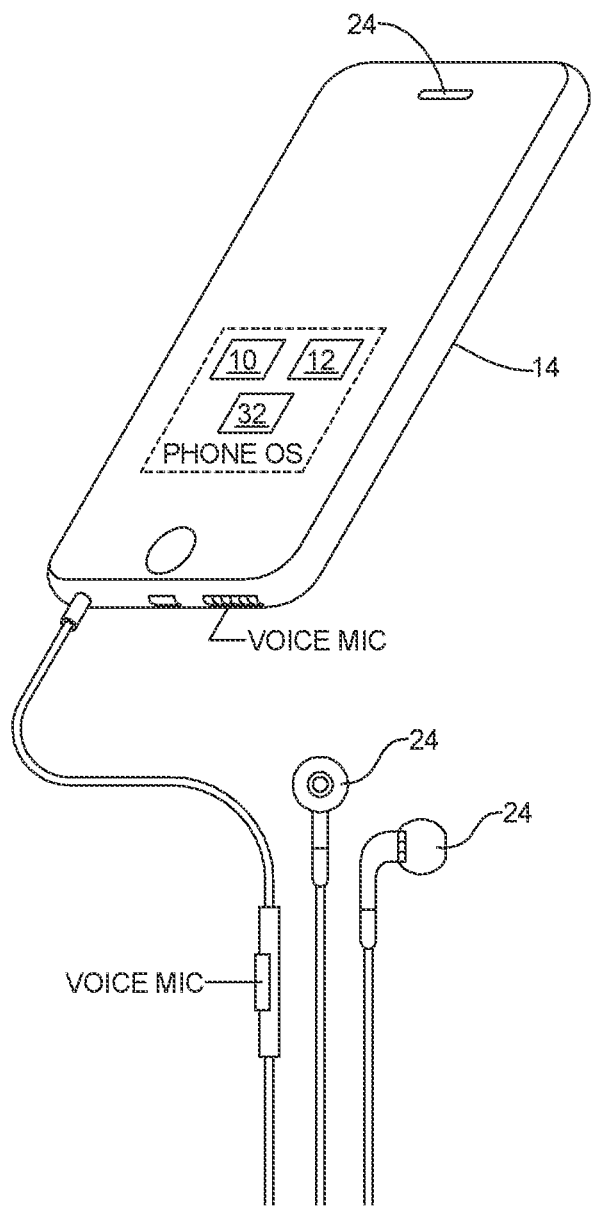
FIG. 17 is an exemplary smartphone integration embodiment.

One such embodiment shown in FIG. 17 is a smartphone handheld application, where the input mic is on the back of the smartphone, the speaker is the receiver speaker of the smartphone, the Core Engine is implemented using the smartphone's processor, and the feedback mic is not used (due to the fixed geometry). In this embodiment, the same anti-noise can be added to the microphone transmission. An alternate of this embodiment includes a passive headset plugged into the mic/headphone jack, lightning connector, etc. For this alternate embodiment to be effective, the mic on the phone would need to be exposed to the ambient noise, and not in a pocket, purse or backpack.

Figure 18:
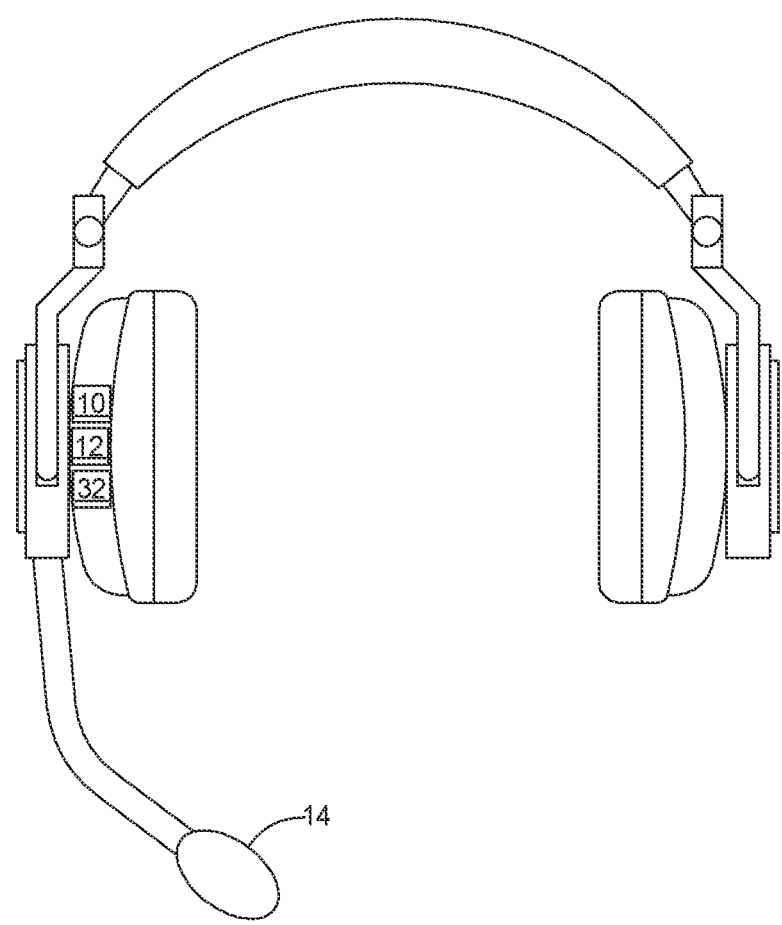
FIG. 18 is an exemplary noise cancelling headphone embodiment.

Another consumer-grade embodiment would be a noise cancelling headset, headphones, or earbuds with the Core Engine processing performed using a processor and input microphone(s) included as part of the headset, headphones or earbuds as shown in FIG. 18. In this embodiment (as described earlier), a common processor could be used for both ears of a stereo system for lower cost/performance products, and individual processors could be utilized for each ear for higher cost/performance products.

Figure 19:
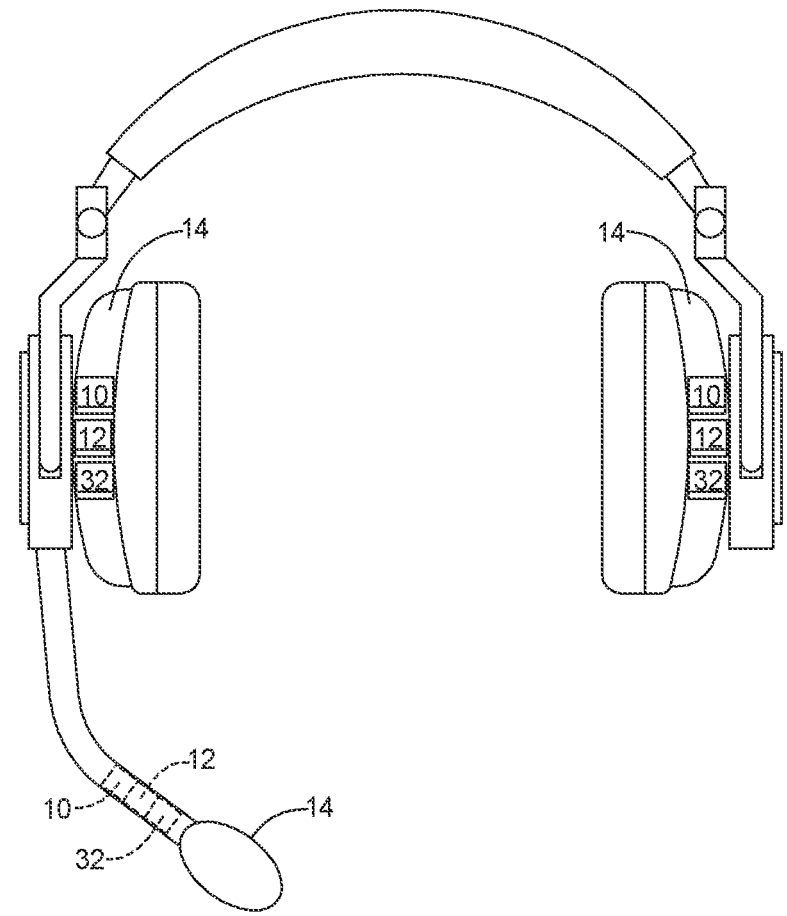
FIG. 19 is another exemplary noise cancelling headphone embodiment.

Commercial and military-grade products would likely utilize faster processors, separate processing for each ear piece, and a separate processor for the microphone noise cancelling. For the most critical applications, additional input microphone(s) would be used to capture severe ambient noise (due to stadium crowds, wind, vehicles, ordnance, etc.) and the microphone Core Engine processor would be in close proximity to the actual transmission microphone as shown in FIG. 19. For examples, Navy Seals on F470 Combat Rubber Raiding Craft could dispense with the throat mics they currently using and have the benefit of better communication using this type of system. Similarly, sports broadcasters would enjoy smaller, lighter weight, less obtrusive, more "camera friendly" headset designs.

Offline Signal Processing (Audio)

Figure 20:
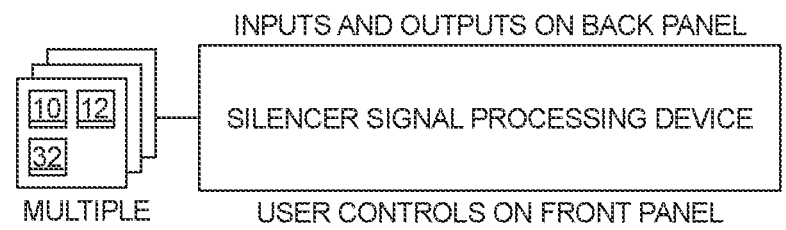
FIG. 20 illustrates an exemplary processor implementation.

The Offline Signal Processing system can be implemented as illustrated in FIG. 3 and described above. In this embodiment, known noise characteristics can be reduced or eliminated from recordings, or in a live situation with an appropriate delay between the action and actual broadcast. In this embodiment, the Core Engine may be a "plug in" of another editing or processing software system, incorporated into another signal processor, or as a stand-alone device as shown in FIG. 20. If the characteristics of the noise to be removed (or alternatively, of the signal to be passed in an unknown noise environment: excluding those frequencies from the frequency band range settings and setting the amplitude scaling factor to 1 for frequencies not included in the frequency band range definitions would enable only those frequencies to pass), the system parameters can be set manually (or via presets) to effectively remove the noise and pass the target signal. Alternatively, calibration mode can be used to analyze the noise of a "pre-roll" portion to determine the appropriate anti-noise settings. Use cases for this embodiment include removing noise from old recordings, reducing noise in a "live" situation without adversely affecting the quality of a voice announcer, removing noise from a surveillance recording, enhancing audio on a surveillance recording, etc.

Encryption/Decryption (Audio Band or Beyond)

The encryption/decryption system can be implemented as illustrated in FIG. 4, and described above. The primary use case here is the transmission of private information by surreptitiously encoding it into narrow segments of a wideband transmission or noise signal in a manner which does not meaningfully impact the wideband signal. Another use case for this embodiment is to include additional data or information about the wideband transmission. As shown in FIG. 21, an encryption "key" would include the frequency and amplitude information for "carving out" discrete "channels" in the broadband signal which would not materially affect the broadband content (white noise for example). The encoded signal would be placed on "carriers" of the appropriate frequencies via modulation, so when the "carriers" are added to the broadband content, it would appear "normal" to observers. The "decryption" key would prescribe amplitude and frequency settings for the frequency band ranges which would result in the cancellation of all information except those "carriers", which could then be demodulated and decoded. It is expected this would be accomplished most often by excluding the "carrier" frequencies from the frequency band definitions, and having the default amplitude from excluded frequencies set to 0. "Carrier" signals preservation may be further enhanced by appropriately scaling the amplitude of anti-noise created immediately adjacent to the "carrier" frequencies as part of the "decryption key" definition.

In an alternate embodiment the encryption/decryption system may dispense with the step of "carving out" discrete channels in the broadband signal. Rather, those discrete channels are simply identified by the processor, based on private a priori knowledge of which portions of the frequency spectra are to be chosen. Such a priori knowledge of these selected channels are stored in memory accessed by the processor and also made known to the intended message recipient by surreptitious or private means. The message to be sent is then modulated onto a suitable carrier that places the message in these discrete channels, but mixed with the noise signal that is otherwise present. The entire wideband signal (including the discrete channels masked by noise) is then transmitted. Upon receipt the wideband signal is processed on the decoding side using a processor that is programmed to subdivide the broadband signal into segments, identify the discrete channels bearing the message (based on a priori knowledge of the channel frequencies) and perform the noise abatement on the message carrying channels.

Signal Signature Recognition, Detection or Reception Enhancement (Audio Band and Beyond)

Figure 22:
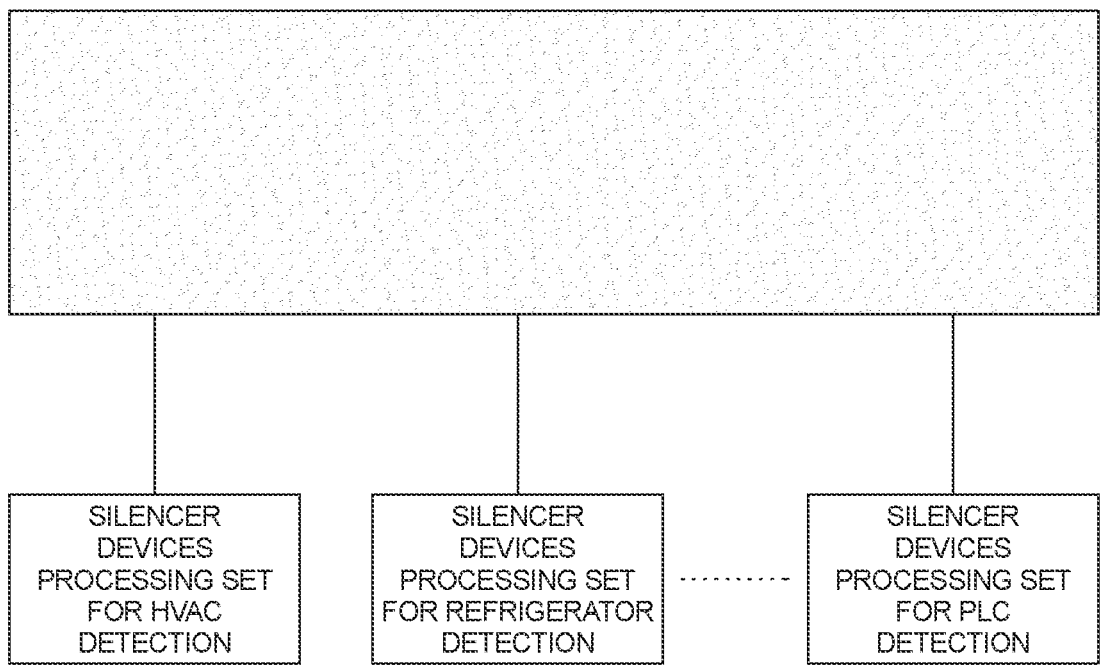
FIG. 22 illustrates an exemplary signature detection concept.

Signal signature recognition, detection, or reception enhancement can be implemented as shown in FIG. 5, and described above. This embodiment of the Core Engine facilitates recognizing, detecting or enhancing specific types of transmissions or device signatures in a noise field. FIG. 22 illustrates the potential for recognizing or detecting a variety of signatures in a single noise or data transmission field by deploying multiple instances of the core engine to examine that field. Unlike other embodiments where a microphone is used to capture the incoming noise signal, in this embodiment the noise produced by a particular device is captured over a predetermined period of time and then the captured data are processed by computing a moving average, or other statistical smoothing manipulation, to develop a noise signature for that device. Depending on the nature of the device, this noise signature may be an audio frequency signature (e.g., representing the sound of a blower motor fan) or it may be an electromagnetic frequency signature (e.g., representing radio frequency interference produced by a commutated motor or electronically switched motor). Thereafter, the noise signature for that device is used to generate the anti-noise signal. Noise signatures developed in this fashion can be stored in memory (or within a database for access by other systems) and accessed by the signal processing circuit, as needed, to abate the noise of specific devices or classes of devices.

In addition to being useful for noise abatement of specific devices, the database of stored noise signatures can also be useful in identifying devices by the signature of the noises produced, by setting the Core Engine to pass only those signatures. One use case would be to enable power companies to detect the energizing of non-smart grid products to help anticipate grid load caused by legacy products (HVAC systems, refrigerators, etc.). Another use case would be to detect or enhance a distant or weak electromagnetic communication of known characteristics. Alternatively, the frequency and amplitude parameters of the frequency band ranges could be set to detect disturbances in a transmission or noise field associated with specific incidents, such as: the electromagnetic interference which might be caused by an unmanned drone or other object traversing the transmission or noise field, activation of surveillance or counter-surveillance equipment, tampering with the transmission or field sources, celestial or terrestrial events, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of noise abatement within a signal stream containing unwanted signal referred to as noise, comprising:
   acquiring a digitized noise signal from an environment in which the signal stream is present;
   dividing, by a digital processor circuit, the digitized noise signal into a set of different frequency ranges;
   subdividing at least one frequency range in the set of frequency ranges into a plurality of noise segments;
   computing, by a digital processor circuit, a frequency domain representation for the digitized noise signal, where the computation of the frequency domain representation occurs before or after the steps of dividing and subdividing;
   individually shifting the frequency domain representation of one or more of the noise segments which comprise the digitized noise signal in time using the digital processor circuit, where quantity of time shift is dependent on a selected frequency in the frequency domain representation and takes in account both an in-air propagation time of the noise signal and a system propagation time associated with the throughput speed of the digital processor circuit and any associated equipment, where the in-air propagation time is transit time for a signal to travel though air from an input microphone to a feedback microphone;
   converting the frequency domain representation for each noise segment of the digitized noise signal to time domain to form an anti-noise signal; and
   outputting the anti-noise signal into the signal stream to abate the noise through destructive interference.

2. The method of claim 1 further comprises subdividing each frequency range in the set of frequency ranges such that the number of noise segments for a given frequency range can vary between frequency ranges in the set of frequency ranges.

3. The method of claim 1 further comprises selectively applying a phase correction to one or more of the noise segments which comprise the digitized noise signal.

4. The method of claim 1 further comprises shifting the frequency domain representation of noise segments in one frequency range without shifting the frequency domain representation of noise segments in another frequency range in the set of frequency ranges.

5. The method of claim 1 further comprises selectively applying an amplitude scaling to one or more of the noise segments which comprise the digitized noise signal.

6. The method of claim 1 further comprises amplitude scaling in one frequency range without amplitude scaling in another frequency range in the set of frequency ranges.

7. The method of claim 1 further comprising converting the anti-noise signal into an analog signal and outputting the anti-noise signal into the signal stream by mixing it with the noise within the signal stream.

8. The method of claim 7 further comprising mixing the anti-noise signal with the noise within the signal stream by using an amplified loudspeaker or other transducer disposed within the signal stream.

9. A system for noise abatement in an audio signal stream which contains a noise signal, comprising:
   a microphone configured to acquire a noise signal from an environment in which the audio signal stream is present;
   an analog-to-digital converter configured to receive the noise signal from the microphone and operate to convert the noise signal to a digitized noise signal;
   a digital signal processor configured to receive the digitized noise signal from the analog-to-digital converter and process the digitized noise signal by
      dividing, by a digital processor circuit, the digitized noise signal into a set of different frequency ranges,
      subdividing at least one frequency range in the set of frequency ranges into a plurality of noise segments,
      computing a frequency domain representation of the digitized noise signal in frequency domain, where the computation of the frequency domain representation occurs before or after the steps of dividing and subdividing,
      shifting the frequency domain representation of one or more noise segments which comprise the digitized noise signal in time, thereby producing a shifted frequency domain representation of the digitized noise signal, where quantity of the time shift is dependent on a selected frequency in the frequency domain representation and takes in account both an in-air propagation time of the noise signal and a system propagation time associated with the throughput speed of the digital processor circuit, where the in-air propagation time is transit time for a signal to travel through air from the microphone to a feedback microphone, and
      converting the shifted frequency domain representation for each noise segment of the digitized noise signal to time domain to form an anti-noise signal; and
   a digital-to-analog converter configured to receive the anti-noise signal from the digital signal processor and operate to convert the anti-noise signal to an analog anti-noise signal.

10. The system of claim 9 further comprises subdividing each frequency range in the set of frequency ranges such that the number of noise segments for a given frequency range can vary between frequency ranges in the set of frequency ranges.

11. The system of claim 9 wherein the digital signal processor selectively applies a phase correction to one or more of the noise segments which comprise the digitized noise signal.

12. He system of claim 9 wherein the digital signal processor selectively applies an amplitude scaling to one or more of the noise segments which comprise the digitized noise signal.

13. The system of claim 9 further comprises a mixer configured to receive the audio signal stream and the analog anti-noise signal and operate to combine the audio signal stream with the analog anti-noise signal.

* * * * *